US012568214B2

(12) United States Patent
Gao et al.

(10) Patent No.: US 12,568,214 B2
(45) Date of Patent: Mar. 3, 2026

(54) MULTI-TYPE TREE DEPTH EXTENSION FOR PICTURE BOUNDARY HANDLING

(71) Applicant: HUAWEI TECHNOLOGIES CO., LTD., Shenzhen (CN)

(72) Inventors: Han Gao, Shenzhen (CN); Zhijie Zhao, Shenzhen (CN); Semih Esenlik, Munich (DE); Anand Meher Kotra, Munich (DE); Jianle Chen, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/628,446

(22) Filed: Apr. 5, 2024

(65) Prior Publication Data

US 2024/0251080 A1      Jul. 25, 2024

Related U.S. Application Data

(63) Continuation of application No. 17/682,893, filed on Feb. 28, 2022, now Pat. No. 11,968,363, which is a
(Continued)

(51) Int. Cl.
H04N 19/119 (2014.01)
H04N 19/176 (2014.01)
(Continued)

(52) U.S. Cl.
CPC ......... H04N 19/119 (2014.11); H04N 19/176 (2014.11); H04N 19/184 (2014.11); H04N 19/96 (2014.11)

(58) Field of Classification Search
CPC .. H04N 19/119; H04N 19/176; H04N 19/184; H04N 19/96; H04N 19/70; H04N 19/167; H04N 19/174; H04N 19/30
See application file for complete search history.

(56) References Cited

U.S. PATENT DOCUMENTS

2014/0254670 A1      9/2014   Kwon et al.
2015/0382025 A1    12/2015   Gu et al.
(Continued)

FOREIGN PATENT DOCUMENTS

CN          104243997 A     12/2014
CN          107005718 A      8/2017
(Continued)

OTHER PUBLICATIONS

Wu et al., "Description of SDR video coding technology proposal by University of Science and Technology of China, Peking University, Harbin Institute of Technology, and Wuhan University (IEEE 1857.10 Study Group)," Joint Video Experts Team (JVET) of ITU-T SG 16 WP 3 and ISO/IEC JTC 1/SC 29/WG 11, 10th Meeting: San Diego, US, Document: JVET-J0032-v2, Total 48 pages (Apr. 10-20, 2018).
(Continued)

*Primary Examiner* — Nam D Pham
(74) *Attorney, Agent, or Firm* — Leydig, Voit & Mayer, Ltd.

(57) ABSTRACT

The present disclosure provides apparatuses and methods for splitting an image into coding units. An image is divided into coding tree units (CTUs) which are hierarchically partitioned. Hierarchical partitioning includes multi-type partitioning such as binary tree or quad tree splitting. For CTUs completely within the image and CTUs on the boundary, respective multi-type partition depths are chosen. The present disclosure provides for multi-type partitioning flexibility in a boundary portion of the image.

19 Claims, 14 Drawing Sheets

Related U.S. Application Data continuation of application No. 17/107,318, filed on Nov. 30, 2020, now Pat. No. 11,323,707, which is a continuation of application No. PCT/EP2019/064061, filed on May 29, 2019.

(60) Provisional application No. 62/678,241, filed on May 30, 2018.

(51) Int. Cl.
H04N 19/184 (2014.01)
H04N 19/96 (2014.01)

(56) References Cited

U.S. PATENT DOCUMENTS

| | | |
|---|---|---|
| 2017/0272782 A1 | 9/2017 | Li et al. |
| 2021/0344909 A1* | 11/2021 | Liu ..................... H04N 19/105 |

FOREIGN PATENT DOCUMENTS

| | | |
|---|---|---|
| RU | 2642373 C1 | 1/2018 |
| WO | 2016090568 A1 | 6/2016 |
| WO | 2016091161 A1 | 6/2016 |
| WO | 2016155641 A1 | 10/2016 |
| WO | 2017123980 A1 | 7/2017 |
| WO | 2018070550 A1 | 4/2018 |
| WO | 2018088805 A1 | 5/2018 |
| WO | 2018177741 A1 | 10/2018 |
| WO | 2019185456 A1 | 10/2019 |

OTHER PUBLICATIONS

Ma et al., "Description of Core Experiment 1 (CE 1): Partitioning," Joint Video Exploration Team (JVET) of ITU-T SG 16 WP 3 and ISO/IEC JTC 1/SC 29/WG 11, 10th Meeting: San Diego, US, Document: JVET-J1021, pp. 1-30 (Apr. 10-20, 2018).

Chen et al., "Algorithm description for Versatile Video Coding and Test Model 1 (VTM 1)," Joint Video Experts Team (JVET) of ITU-T SG 16 WP 3 and ISO/IEC JTC 1/SC 29/WG 11, 10th Meeting: San Diego, US, Document: JVET-J1002-v1, Total 7 pages (Apr. 10-20, 2018).

Chen et al., "Algorithm Description of Joint Exploration Test Model 6 (JEM6)," Joint Video Exploration Team (JVET)) of ITU-T SG 16 WP 3 and ISO/IEC JTC 1/SC 29/WG 11, 6th Meeting: Hobart AU, Mar. 31-Apr. 7, 2017, Document: JVET-F1001-v2, XP030150793, Total 49 pages, International Union of Telecommunication, Geneva, Switzerland (May 31, 2017).

Ma et al., "Quadtree plus binary tree with shifting (including software)," Joint Video Exploration Team (JVET) of ITU-T SG 16 WP 3 and ISO/IEC JTC 1/SC 29/WG 11, 10th Meeting: San Diego, US, Document: JVET-J0035-v4, Total 23 pages, International Union of Telecommunication, Geneva, Switzerland (Apr. 10-20, 2018).

Tjo D.yu, "Methods and algorithms for adaptive splitting video frames into coding blocks in video coding system H.265/HEVC," Found on Sep. 19, 2022, Total 131 pages (2016). With an English abstract.

Sze et al., "High Efficiency Video Coding (HEVC), Algorithms and Architectures," total 384 pages, Springer International Publishing, Switzerland (2014).

U.S. Appl. No. 17/682,893, filed Feb. 28, 2022, Patented.

U.S. Appl. No. 17/107,318, filed Nov. 30, 2020, Patented.

Zhu et al., "CEI: Implicit QT, BT and MTT Partitions on Picture Boundary (Test 2.0.15)," Joint Video Experts Team (JVET) of ITU-T SG 16 WP 3 and ISO/IEC JTC 1/SC 29/WG 11, 11th Meeting: Ljubljana, SI, Document: JVET-K0316-v1, total 9 pages (Jul. 10-18, 2018).

Gao et al., "CE1-2.0.11: Picture Boundary Handling," Joint Video Ex perts Team (JVET) of ITU-T SG 16 WP 3 and ISO/IEC JTC 1/SC 29/WG 11, JVET-K0287-v1, 11th Meeting: Ljubljana, SI, total 7 pages (Jul. 10-18, 2018).

* cited by examiner (b)

(a)

MULTI-TYPE TREE DEPTH EXTENSION FOR PICTURE BOUNDARY HANDLING

CROSS-REFERENCE TO RELATED APPLICATIONS

This application is a continuation of U.S. patent application Ser. No. 17/682,893, filed on Feb. 28, 2022, now U.S. Pat. No. 11,968,363, which is a continuation of U.S. application Ser. No. 17/107,318, filed on Nov. 30, 2020, now U.S. Pat. No. 11,323,707, which is a continuation of International Application No. PCT/EP2019/064061, filed on May 29, 2019, which claims the priority of U.S. provisional Application No. 62/678,241, filed on May 30, 2018. All of the afore-mentioned patent applications are hereby incorporated by reference in their entireties.

TECHNICAL FIELD

The present disclosure relates the field of video processing, in particular to the topic normally referred to as hybrid video coding and compression.

BACKGROUND

The Versatile Video Coding (VVC) next generation standard is the most recent joint video project of the ITU-T Video Coding Experts Group (VCEG) and the ISO/IEC Moving Picture Experts Group (MPEG) standardization organizations, working together in a partnership known as the Joint Video Exploration Team (JVET).

Current block-based hybrid video codecs employ predictive coding. A picture of a video sequence is subdivided into blocks of pixels and these blocks are then coded. Instead of coding a block pixel by pixel, the entire block is predicted using already encoded pixels in the spatial or temporal proximity of the block. The encoder further processes only the differences between the block and its prediction. The further processing typically includes a transformation of the block pixels into coefficients in a transformation domain. The coefficients may then be further compressed (e.g., by means of quantization) and further compacted (e.g., by entropy coding) to form a bitstream. The bitstream can further include any signaling information which enables the decoder to decode the encoded video. For instance, the signaling may include settings concerning the encoder settings such as size of the input picture, frame rate, quantization step indication, prediction applied to the blocks of the pictures, or the like.

The differences between a block and its prediction are known as the residual of the block. More specifically, each pixel of the block has a residual, which is the difference between an intensity level of that pixel and its predicted intensity level. The intensity level of a pixel is referred to as the pixel value or value of the pixel. The residuals of all the pixels of a block are referred to collectively as the residual of the block. In other words, the block has a residual which is a set or matrix consisting of the residuals of all the pixels of the block. The residuals are then transformed, quantized, and coded together with signaling information. The coding may include various form of fixed and variable length coding including arithmetic coding or other entropy coding types.

In the block-based hybrid video coding, each picture is partitioned into blocks of samples and multiple blocks within a picture are aggregated to form slices as independently decodable entities. The blocks, to which prediction and/or transformation are applied is referred to as a coding unit (CU) or coding block (CB). The coding units may have different sizes.

For instance, in High-Efficiency Video Coding (HEVC, also known as H.265), a video frame is subdivided into coding tree units (CTUs, also referred to as coding tree blocks, CTBs). CTBs are disjoint square blocks of the same size, for instance 64×64 samples. Each CTB serves as the root of a block partitioning quad-tree structure, the coding tree. The CTBs can be further subdivided along the coding tree structure into coding blocks. For the coding blocks, a prediction type is determined. The coding blocks may be further split into smaller transformation blocks to which transformation and quantization is applied.

Details concerning the partitioning in HEVC can be found in V. Sze et al (Ed.). *High Efficiency Video Coding (HEVC): Algorithms and Architectures. Springer.* 2014. *Chapter* 3.2.

In addition, WO 2016/090568 shows a binary tree structure for partitioning a unit into multiple smaller units using the quad-tree plus a binary tree structure. Accordingly, the root unit is firstly partitioned by a quad-tree structure, and then the leaf node of the quad-tree is further partitioned by a binary tree structure.

SUMMARY

Embodiments of the invention are defined by the features of the independent claims and further advantageous implementations of the embodiments by the features of the dependent claims.

According to a general aspect, the present disclosure provides an apparatus for splitting an image into coding units, the apparatus including a processing circuitry. The apparatus is configured to subdivide the image into coding tree units, CTUs, including a non-boundary CTU with a predetermined size in a horizontal and a vertical direction and a boundary CTU having a portion within the image delimited by a horizontal or vertical image boundary, the portion having a size smaller than the predetermined size in a direction perpendicular to the image boundary, and partition the non-boundary CTU and the boundary CTU hierarchically into respective coding units, wherein the hierarchical partitioning of the non-boundary CTU includes multi-type splitting with a maximum non-boundary multi-type partition depth, multi-type splitting being splitting with the splitting direction being either the vertical or the horizontal direction, and the hierarchical partitioning of the boundary CTU includes multi-type splitting with a maximum boundary multi-type partition depth.

This provides the advantage that the flexibility of boundary partitioning is enhanced.

In a further implementation of the apparatus, the maximum boundary multi-type partition depth is a sum of at least an adaptive boundary multi-type partition depth and a predefined multi-type partition depth, the adaptive boundary multi-type partition depth being a depth of multi-type splitting with splitting direction being the direction of the image boundary.

This provides for an adaptive determination of the partition depth for when using multi-type splitting in a boundary coding tree unit or partition block.

For instance, the predefined multi-type partition depth is equal to the maximum non-boundary multi-type partition depth.

This provides for reusing the maximum non-boundary multi-type partition depth.

In a further implementation of the apparatus, the sum further includes a function of a ratio of sizes in the direction of the image boundary and the direction perpendicular to the image boundary of a boundary partition block of the boundary CTU, the boundary partition block being a block of the adaptive boundary multi-type partition depth.

This provides for further increasing the maximum depth of multi-type boundary partitioning and thus enhancing the partitioning flexibility.

For example, the function is the binary logarithm.

This is beneficial as it provides for a practical implementation.

In some further embodiments, the maximum boundary multi-type partition depth is predefined.

This facilitates reducing the computational cost in determining a hierarchical partitioning.

For example, the hierarchical splitting of the boundary CTU further includes quad tree splitting.

This provides for flexibly selecting from different modes.

In a further implementation of the apparatus, the maximum boundary multi-type partition depth is equal to or greater than the maximum non-boundary multi-type partition depth.

This provides for enhancing the maximum possible boundary partitioning depth.

Further provided is an apparatus for encoding an image of a video sequence comprising the apparatus for splitting an image into coding units according to any of the above examples and embodiments. The apparatus further comprises an image coding unit configured to encode the coding units, and a bitstream forming unit configured to generate a bitstream including the encoded coding units and a partitioning information indicating how the coding tree units are partitioned.

In a further implementation, the apparatus for encoding an image includes the apparatus for splitting an image wherein the maximum boundary multi-type partition depth is predefined, and the bitstream further includes an encoded sequence parameter set including the maximum boundary multi-type partitioning depth.

Moreover provided is an apparatus for decoding an image of a video sequence comprising a bitstream parser for parsing a bitstream including encoded coding units, the apparatus for determining splitting of an image according to any to any of the above examples and embodiments, and an image decoding unit for decoding the encoded coding units based on the determined splitting of the image.

In a further implementation, the apparatus for decoding an image includes the apparatus for determining splitting of an image wherein the maximum boundary multi-type partition depth is predefined, the bitstream further includes an encoded sequence parameter set including the maximum boundary multi-type partitioning depth, and the apparatus for determining splitting of an image is further configured to obtain the second maximum multi-type partitioning depth from the sequence parameter set.

According to another general aspect, a method is provided for splitting an image into coding units. The method includes subdividing the image into coding tree units, CTUS, including a non-boundary CTU with a predetermined size in a horizontal and a vertical direction and a boundary CTU having a portion within the image delimited by a horizontal or vertical image boundary, the portion having a size smaller than the predetermined size in a direction perpendicular to the image boundary, and partitioning the non-boundary CTU and the boundary CTU hierarchically into respective coding units, wherein the hierarchical partitioning of the non-boundary CTU includes multi-type splitting with a maximum non-boundary multi-type partition depth, multi-type splitting being splitting with the splitting direction being either the vertical or the horizontal direction, and the hierarchical partitioning of the boundary CTU includes multi-type splitting with a maximum boundary multi-type partition depth.

In a further implementation of the method, the maximum boundary multi-type partition depth is a sum of at least an adaptive boundary multi-type partition depth and a predefined multi-type partition depth, the adaptive boundary multi-type partition depth being a depth of multi-type splitting with splitting direction being the direction of the image boundary.

For instance, the predefined multi-type partition depth is equal to the maximum non-boundary multi-type partition depth.

In a further implementation of the method, the sum further includes a function of a ratio of sizes in the direction of the image boundary and the direction perpendicular to the image boundary of a boundary partition block of the boundary CTU, the boundary partition block being a block of the adaptive boundary multi-type partition depth.

For example, the function is the binary logarithm.

In another embodiment, the maximum boundary multi-type partition depth is predefined.

In a further implementation, the hierarchical splitting of the boundary CTU further includes quad tree splitting.

For instance, the maximum boundary multi-type partition depth is equal to or greater than the maximum non-boundary multi-type partition depth.

Further provided is a method for encoding an image of a video sequence, the method including the steps of splitting an image into coding units according to any of the above embodiments, and a bitstream forming step of generating a bitstream including the encoded coding units and a partitioning information indicating how the coding tree units are partitioned.

In a further implementation, the method for encoding an image includes the method for splitting an image wherein the maximum boundary multi-type partition depth is predefined, and the bitstream further includes an encoded sequence parameter set including the maximum boundary multi-type partitioning depth.

Further provided is a method for decoding an image of a video sequence, the method including a step of parsing a bitstream including the encoded coding units: the steps of determining splitting of an image according any of the above embodiments, and an image decoding step of decoding the encoded coding units based on the determined splitting of the image.

In a further implementation, the method for decoding an image includes the method for determining splitting of an image wherein the maximum boundary multi-type partition depth is predefined, the bitstream further includes an encoded sequence parameter set including the maximum boundary multi-type partitioning depth, and the method for determining splitting of an image further includes obtaining the second maximum multi-type partitioning depth from the sequence parameter set.

As a further aspect, the present disclosure provides a computer readable medium storing instructions which, when executed by a processing circuitry, cause the processing circuitry to execute the method for splitting an image into coding units, the method for encoding an image of the video sequence, or the method for decoding an image of the video sequence according to any of the above embodiments.

Details of one or more embodiments are set forth in the accompanying drawings and the description below. Other features, objects, and advantages will be apparent from the description, drawings, and claims.

BRIEF DESCRIPTION OF DRAWINGS

In the following embodiments of the invention are described in more detail with reference to the attached figures and drawings, in which.

DETAILED DESCRIPTION

The present invention relates to splitting (i.e. partitioning) of an image into smaller units for further processing. Such splitting may be advantageously used in still image or video image coding and decoding. In the following, exemplary video coder and decoder are described, which can implement the splitting according to the present disclosure.

Figure 1:
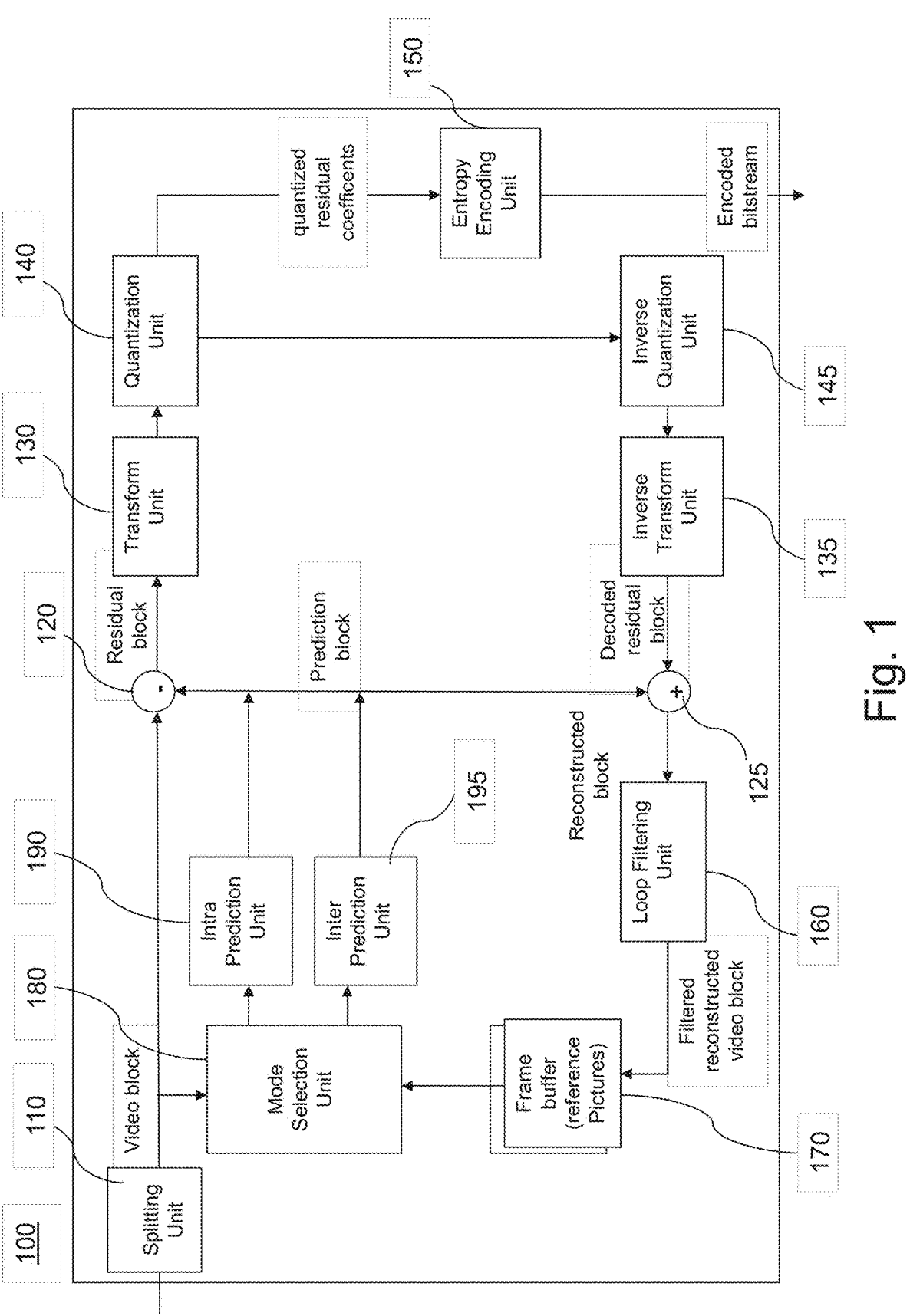
FIG. 1 is a block diagram showing an exemplary structure of a video encoder configured to implement embodiments of the invention.

FIG. 1 shows an encoder 100 which comprises an input for receiving input blocks of frames or pictures of a video stream and an output for providing an encoded video bitstream. The term "frame" in this disclosure is used as a synonym for picture. However, it is noted that the present disclosure is also applicable to fields in case interlacing is applied. In general, a picture includes m times n pixels. These correspond to image samples and may each comprise one or more color components. For the sake of simplicity, the following description refers to pixels meaning samples of luminance. However, it is noted that the splitting approach of the present disclosure can be applied to any color component including chrominance or components of a color space such as RGB or the like. On the other hand, it may be beneficial to perform splitting for only one component and to apply the determined splitting to more (or all) remaining components.

The encoder 100 is configured to apply partitioning, prediction, transformation, quantization, and entropy coding to the video stream.

In a splitting unit 110, the input video frame is further split before coding. The blocks to be coded do not necessarily have the same size. One picture may include blocks of different sizes and the block rasters of different pictures of video sequence may also differ. In particular, each video image (picture) is at first subdivided into CTUs of the same fixed size. The CTU size may be fixed and predefined, for instance in a standard. In HEVC, size of 64×64 is used. However, the present disclosure is not limited to standardized and fixed sizes. It may be advantageous to provide a CTU size which may be set at the encoder and provided as a signaling parameter within the bitstream. For instance, different CTU sizes may be beneficial for the respective different picture sizes and/or content types. The CTU size may be signaled on any signaling level, for instance, it may be common for the entire video sequence or for its parts (i.e. a plurality of pictures) or individual per picture. Correspondingly, it may be signaled, for instance within a Picture Parameter Set. PPS or within a Sequence Parameter Set. SPS or within a Video Parameter Set. VPS which are known from the current codecs (H.264/AVC, H.265/HEVC), or similar parameter sets. Alternatively, it may be specified in a slice header or at any other level. The CTU size may take values different from 64×64. It may for instance be 128×128 samples large. In general, in order to perform hierarchic splitting by binary-tree or quad-tree, it may be beneficial to provide CTU size which is a power of two, i.e. in the format of $2^n$ with n being an integer larger than 2.

Figure 3:
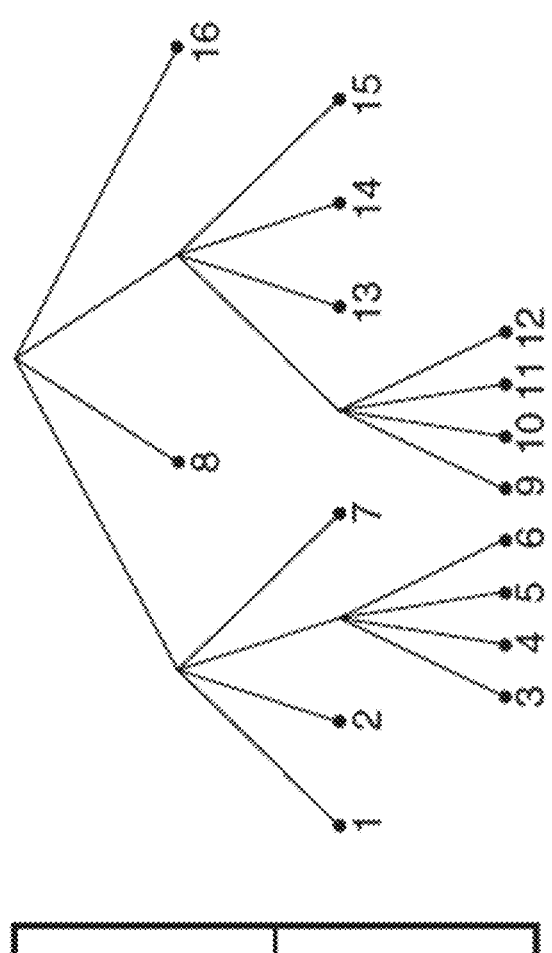
FIG. 3 is a schematic drawing illustrating an example of quad-tree partitioning employed by HEVC.
Figure 3:
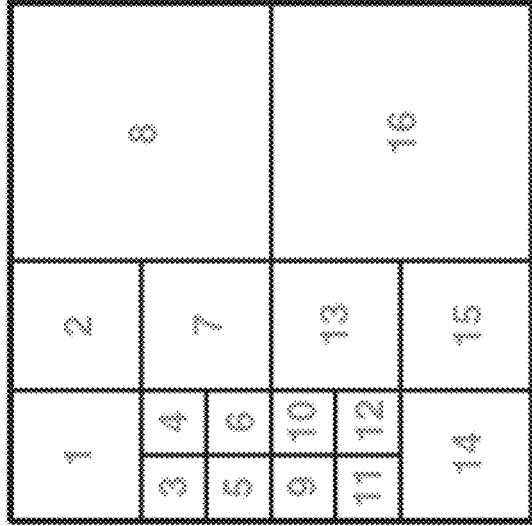

The partitioning of pictures into CTUs and the partitioning of CTUs into CUs are shown in FIG. 3 from *V. Sze et al* (Ed.). *High Efficiency Video Coding (HEVC): Algorithms and Architectures, Springer,* 2014. The partitioning follows a quad-tree structure in order to adapt to various local characteristics. On the left hand side, FIG. 3 shows a CTU split hierarchically in compliance with the quad-tree structure on the right hand side. In particular, the coding tree defines the syntax, which specifies the subdivision of the CTU into CUs. Similarly as a CTU, a CU consists of a square block of samples and the syntax associated with these sample blocks. Thus, the partitioning is performed hierarchically, starting from the CTU (hierarchy depth 0) which may be but does not have to be subdivided into four (in quad-tree) CUs of hierarchy depth 1. In FIG. 3, the CTU is split into CUs 8 and 16 of the first hierarchy depth (level), which are not further split and thus form leafs of the quad-tree as well as two further CUs, which are further split into CUs of hierarchy depth 2 (depth-2 CU). In particular, the top left depth-1 CU is further subdivided into depth-2 CUs 1, 2, 7 forming quad-tree leafs and another CU which is further split into depth-3 CUs 3, 4, 5, and 6 which are all leafs. Similarly, the bottom left depth-1 CU is further split into depth-2 CUs 13, 14, and 15, which are also leafs of the quad-tree and a remaining CU, which is further split into level-3 CUs 9, 10, 11, and 12 which are all leafs and thus, not further split.

An exemplary syntax for the quad-tree splitting in HEVC is shown below in Table 1.

TABLE 1

| Syntax for CTU splitting flags | |
|---|---|
| | Descriptor |
| coding_quadtree( x0, y0, log2CbSize, cqtDepth ) {<br>  if( x0 + ( 1 << log2CbSize) <= pic_width_in_luma_samples &&<br>    y0 + ( 1 << log2CbSize ) <= pic_height_in_luma_samples &&<br>    log2CbSize > MinCbLog2SizeY )<br>      split_cu_flag[ x0 ][ y0 ]<br>  if( cu_qp_delta_enabled_flag && log2CbSize >= Log2MinCuQpDeltaSi<br>ze ) {<br>    IsCuQpDeltaCoded = 0<br>    CuQpDeltaVal = 0<br>}<br>  if( cu_chroma_qp_offset_enabled_flag &&<br>    log2CbSize >= Log2MinCuChromaQpOffsetSize )<br>    IsCuChromaQpOffsetCoded = 0<br>  if( split_cu_flag[ x0 ][ y0 ] ) {<br>    x1 = x0 + ( 1 << (log2CbSize − 1 ) )<br>    y1 = y0 + ( 1 << (log2CbSize − 1 ) )<br>    coding_quadtree( x0, y0, log2CbSize − 1, cqtDepth + 1 )<br>    if( x1 < pic_width_in_luma_samples )<br>      coding_quadtree( x1, y0, log2CbSize − 1, cqtDepth + 1 )<br>    if( y1 < pic_height_in_luma_samples )<br>      coding_quadtree( x0, y1, log2CbSize − 1, cqtDepth + 1 )<br>    if( x1 < pic_width_in_luma_samples && y1 <<br>pic_height_in_luma_samples )<br>      coding_quadtree( x1, y1, log2CbSize − 1, cqtDepth + 1 )<br>  } else<br>    coding_unit( x0, y0, log2CbSize )<br>} | <br><br><br><br><br>ae(v) |

In particular, at the CTU level, a flag named split_cu_flag is included into the bitstream, which indicates whether the complete CTU forms a CU or whether it is split into four equally-sized blocks corresponding to square sample blocks. If the CTU is split, for each of the resulting blocks, another split_cu_flag is transmitted, specifying whether the block represents a CU or whether it is further split into four equally-sized blocks. This hierarchical subdivision is continued until none of the resulting blocks is further subdivided. The minimum size of CUs is signaled in the sequence parameter set, it can range from 8×8 luma samples to the size of the CTU, inclusive. When the minimum CU size is reached in the hierarchical subdivision process, no splitting flags are transmitted for the corresponding blocks; instead it is inferred that these blocks are not further split. In typical HEVC encoder settings, the maximum range of supported CU sizes is exploited so that CUs ranging from 8×8 to 64×64 samples can be used. The CUs inside a CTU are coded in a depth-first order. This coding order is also referred to as z-scan. It ensures that for each CU, except those located at the top or left boundary of a slice, all samples above the CU and left to the CU have already been coded, so that the corresponding samples can be used for intra prediction and the associated coding parameters can be used for predicting the coding parameters of the current CU.

In other words, the split_cu_flag[x0][y0] specifies whether a coding unit is split into coding units with half horizontal and vertical size. The array indices x0, y0 specify the location (x0, y0) of the top-left luma sample of the considered coding block relative to the top-left luma sample of the picture. When split_cu_flag[x0][y0] is not present, the following applies at the decoder:

If log2CbSize (parameter specifying coding block size) is greater than MinCbLog2SizeY (parameter specifying minimum configurable coding unit size), the value of split_cu_flag[x0][y0] is inferred to be equal to 1.

Otherwise (log2CbSize is equal to MinCbLog2SizeY), the value of split_cu_flag[x0][y0] is inferred to be equal to 0.

The array CtDepth[x][y] specifies the coding tree depth for a luma coding block covering the location (x, y). When split_cu_flag[x][y] is equal to 0, CtDepth[x][y] is inferred to be equal to cqtDepth for x=x0 . . . x0+nCbS−1 and y=y0 . . . y0+nCbS−1.

Figure 4:
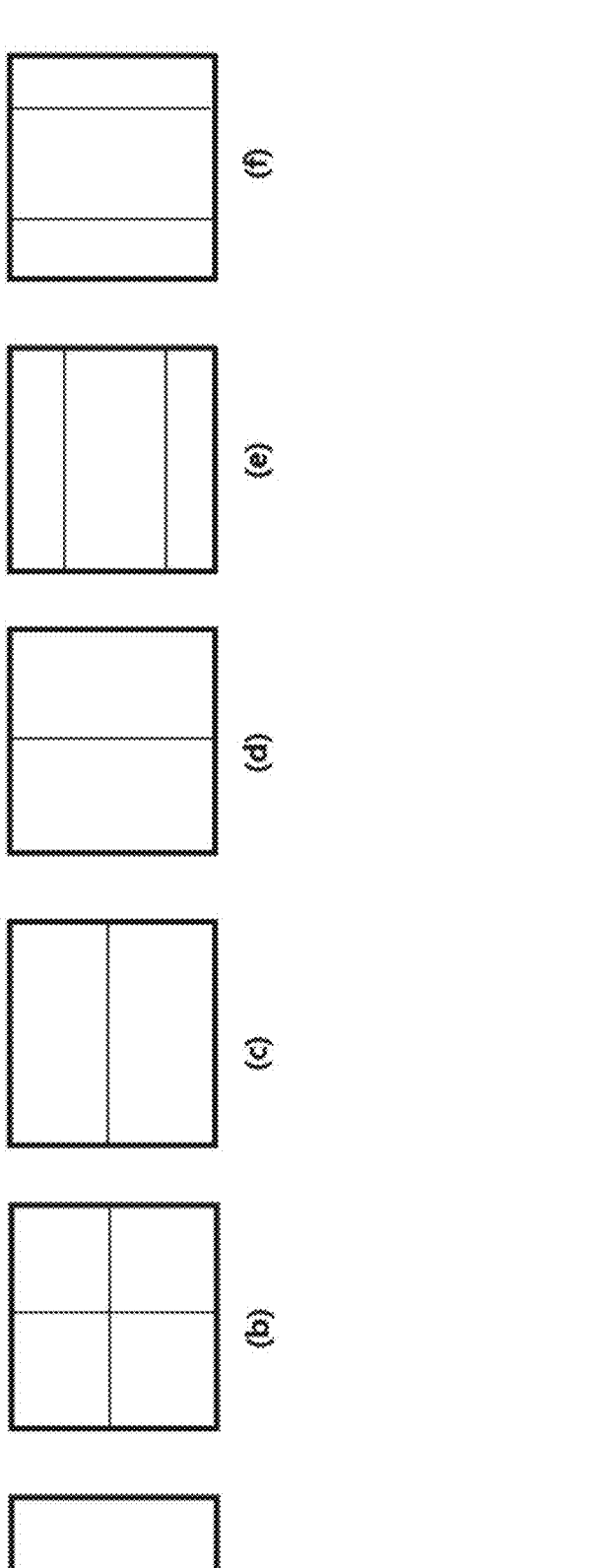
FIG. 4 are diagrams showing several modes of partitioning a coding unit.

In VVC (versatile video coding), a segmentation structure including quad tree (QT) segmentation and multi-type (binary/ternary/asymmetric binary type) tree (BT/TT/ABT) segmentation structure replaces the concepts of multiple partition unit types. In other words, the new segmentation structure removes the separation of the CU (coding unit), PU (prediction unit), and TU (transformation unit) concepts except as needed for CUs that have a size too large for the maximum transform length, and supports more flexibility for CU partition shapes [JVET-J1002]. FIG. 4 illustrated the partition mode of currently used in VTM (VVC Test Model) Part (a) of FIG. 4 shows a CTU or CU where no further split is applied (no split). Part (b) shows the quaternary tree (commonly also referred to as "quad tree") split mode in which a CTU or CU is split both in the vertical and the horizontal direction. Parts (c) and (d) show binary tree split modes in vertical and, respectively, horizontal direction. Further, parts (e) and (f) show ternary tree splitting in vertical and horizontal direction. It can be seen that in ternary tree splitting, there are two blocks of size ¼ and one block of size ½.

The following parameters relating to the hierarchical partitioning of a CTU are defined and specified by syntax elements of in the sequence parameter set (SPS) for the BT/TT/QT coding tree scheme:

CTU size: the root node size of a quaternary tree

MinQTSize: the minimum allowed quaternary tree leaf node size

MaxBTTSize: the maximum allowed binary and ternary tree root node size

MaxBTTDepth: the maximum allowed binary and ternary tree depth

MinBTTSize: the minimum allowed binary and ternary tree leaf node size

MinCUSize: the minimum allowed CU size.

Figure 5:
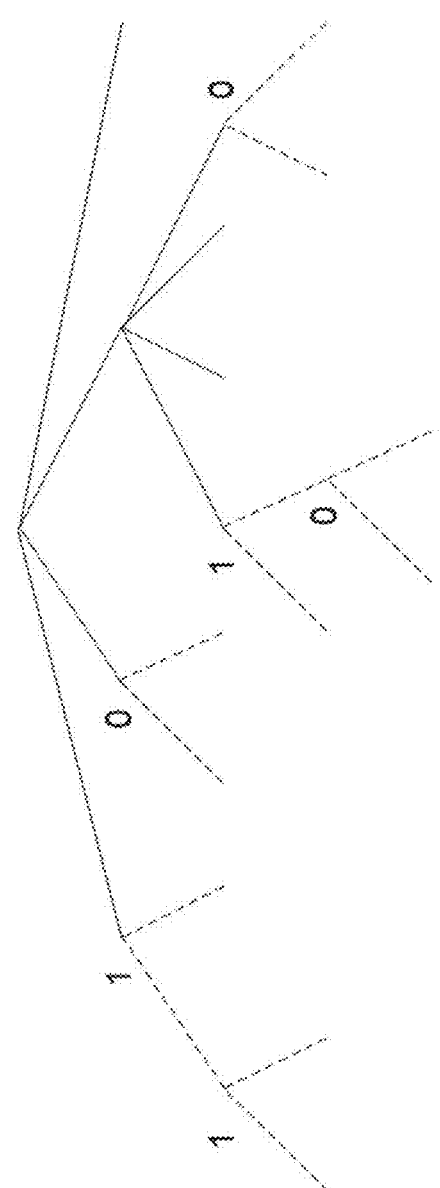
FIG. 5 is a schematic drawing illustrating an example of quad-tree/binary-tree partitioning.
Figure 5:
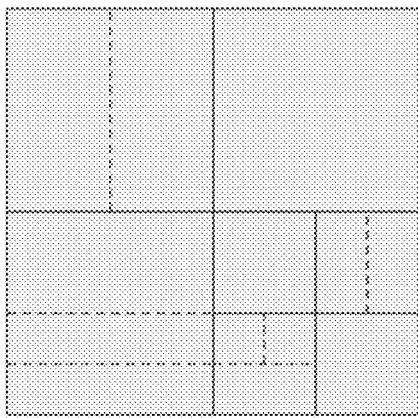

FIG. 5 shows a mixed quad-tree and binary-tree partitioning. Quad-tree partitioning is indicated by solid lines whereas the binary-tree partitioning is indicated by dashed lines. The labels 1 or 0 on the nodes which represent coding units to be further split by the binary-tree indicate whether the binary splitting is applied vertically or horizontally, respectively.

The horizontal and vertical size of a video picture, in luma samples, has to be an integer multiple of the minimum CU size, in luma samples, transmitted in the sequence parameter set, but it does not need to be an integer multiple of the CTU size. If the horizontal or vertical size of the video pictures does not represent an integer multiple of the CTU size, the CTUs at the borders are inferred to be split until the boundaries of the resulting blocks coincide with the picture boundary. For this forced splitting, no splitting flags are transmitted, but the resulting blocks can be further split using the quad-tree syntax described above. The CUs that lie outside the picture area are not coded.

Figure 6:
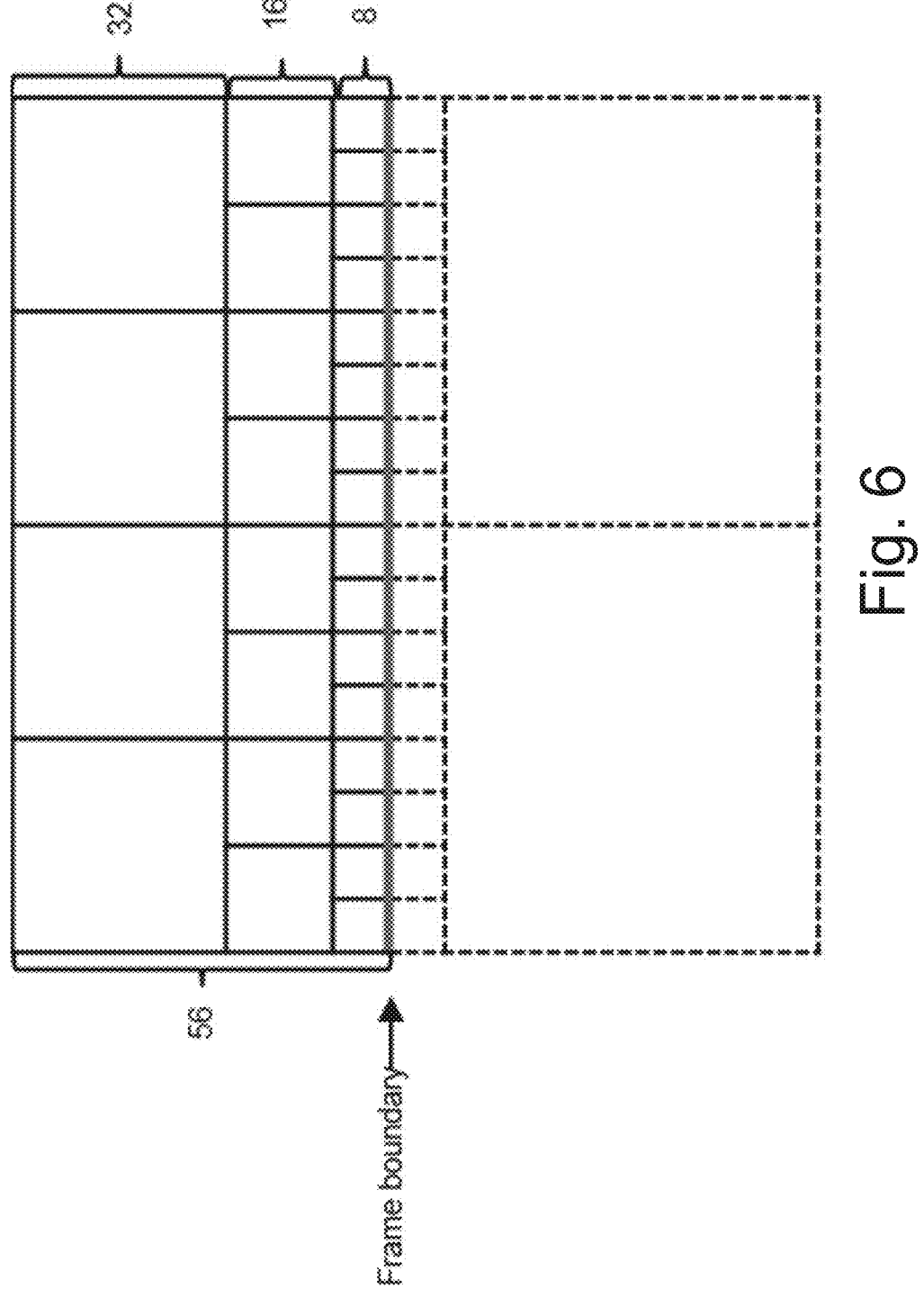
FIG. 6 is a schematic drawing illustrating forced quad-tree splitting of a boundary portion.

This splitting is shown in FIG. 6, which is an illustration of a HD sequence (1920×1080) bottom boundary CTU (128×128) forced QT partition. In particular, FIG. 6 shows a frame boundary above which 56 lines (128 samples long) are a boundary part of a slice or image. The part of the CTU below the frame boundary may belong to another slice or may not be present at all, e.g. if the frame boundary is the bottom picture boundary. As can be seen, forced quad-tree splitting is applied to the 128×56 samples.

The subdivision of the chroma CTBs is in HEVC always aligned with that of the respective luma CTBs. It is noted that the present disclosure may handle the chroma components in the same way, but is not limited thereto. There may also be an independent splitting of different color components.

Returning to FIG. 1, after performing the image splitting in the splitting unit 110, the transformation, quantization, and entropy coding are carried out respectively by a transform unit 130, a quantization unit 140 and an entropy encoding unit 150 so as to generate as an output the encoded video bitstream.

The video stream may include a plurality of frames. The blocks of, for example, the first frame of the video stream are intra coded by means of an intra-prediction unit 190. An intra frame is coded using information from that frame only, so that it can be decoded independently from other frames. An intra frame can thus provide an entry point in the bitstream, e.g., for random access. Blocks of other frames of the video stream may be inter-coded by means of an inter prediction unit 195: each block of an inter-coded frame is predicted from a block in another frame (reference frame), e.g., a previously coded frame. A mode selection unit 180 is configured to select whether a block of a frame is to be intra predicted or inter predicted, i.e. whether it will be processed by the intra prediction unit 190 or the inter-prediction unit 195. The mode selection unit 180 also controls the parameters of intra or inter prediction. In order to enable refreshing of the image information, an inter-coded frame may comprise not only inter coded blocks, but also one or more intra coded blocks. Intra frames, in contrast, contain only intra coded and no inter coded blocks. Intra frames may be inserted in the video sequence (e.g., at regularly, that is, each time after a certain number of inter frames) in order to provide entry points for decoding, i.e. points where the decoder can start decoding without using information from preceding frames.

The intra prediction unit 190 is a block prediction unit. For performing spatial or temporal prediction, the coded blocks may be further processed by an inverse quantization unit 145, and an inverse transform unit 135. After reconstruction of the block by a reconstructor 125 a loop filtering unit 160 may be applied to further improve the quality of the decoded image. The reconstructor 125 adds the decoded residuals to the predictor to obtain reconstructed block. The filtered blocks then form the reference frames that are then stored in a frame buffer 170. Such decoding loop (decoder) at the encoder side provides the advantage of producing reference frames which are the same as the reference pictures reconstructed at the decoder side. Accordingly, the encoder and decoder side operate in a corresponding manner. The term "reconstruction" here refers to obtaining the reconstructed block by adding the decoded residual block to the prediction block.

The inter-prediction unit 195 receives as an input a block of a current frame or picture to be inter coded and one or several reference frames or pictures from the frame buffer 170. Motion estimation and motion compensation are performed by the inter prediction unit 195. The motion estimation is used to obtain a motion vector and a reference frame, e.g., based on a cost function. The motion compensation then describes a current block of the current frame in terms of the translation of a reference block of the reference frame to the current frame, i.e. by a motion vector. The inter prediction unit 195 selects a prediction block (i.e. a predictor) for the current block from among a set of candidate blocks (i.e. candidate predictors) in the one or several reference frames such that the prediction block minimizes the cost function. In other words, a candidate block for which the cost function is minimum will be used as the prediction block for the current block.

For instance, the cost function may be a measure of a difference between the current block and the candidate block, i.e. a measure of the residual of the current block with respect to the candidate block. For example, the cost function may be a sum of absolute differences (SAD) between all pixels (samples) of the current block and all pixels of the candidate block in the candidate reference picture. However, in general, any similarity metric may be employed, such as mean square error (MSE) or structural similarity metric (SSIM).

However, the cost function may also be the number of bits that are necessary to code such inter-block and/or distortion resulting from such coding. Thus, a rate-distortion optimization procedure may be used to decide on the motion vector selection and/or in general on the encoding parameters such as whether to use inter or intra prediction for a block and with which settings.

The intra prediction unit 190 receives as an input a block of a current frame or picture to be intra coded and one or several reference samples from an already reconstructed area of the current frame. The intra prediction then describes pixels of a current block of the current frame in terms of a function of reference samples of the current frame. The intra prediction unit 190 outputs a prediction block for the current block, wherein said prediction block advantageously minimizes the difference between the current block to be coded and its prediction block, i.e., it minimizes the residual block. The minimization of the residual block can be based, e.g., on a rate-distortion optimization procedure. In particular, the prediction block is obtained as a directional interpolation of the reference samples. The direction may be determined by the rate-distortion optimization and/or by calculating a similarity measure as mentioned above in connection with inter-prediction.

The difference between the current block and its prediction, i.e. the residual block, is then transformed by the transform unit 130. The transform coefficients are quantized by the quantization unit 140 and entropy coded by the entropy encoding unit 150. The thus generated encoded video bitstream comprises intra coded blocks and inter coded blocks and the corresponding signaling (such as the mode indication, indication of the motion vector, and/or intra-prediction direction). The transform unit 130 may apply a linear transformation such as a discrete Fourier transformation (DFT) or a discrete cosine transformation (DCT). Such transformation into the spatial frequency domain provides the advantage that the resulting coefficients have typically higher values in the lower frequencies. Thus, after an effective coefficient scanning (such as zig-zag), and quantization, the resulting sequence of values has typically some larger values at the beginning and ends with a run of zeros. This enables further efficient coding. The quantization unit 140 performs a lossy compression by reducing the resolution of the coefficient values. Entropy coding unit 150 then assigns binary codewords to coefficient values. The codewords are written to a bitstream referred to as the encoded bitstream. The entropy coder also codes the signaling information (not shown in FIG. 1) which may include coding according to the splitting flag syntax shown above.

Figure 2:
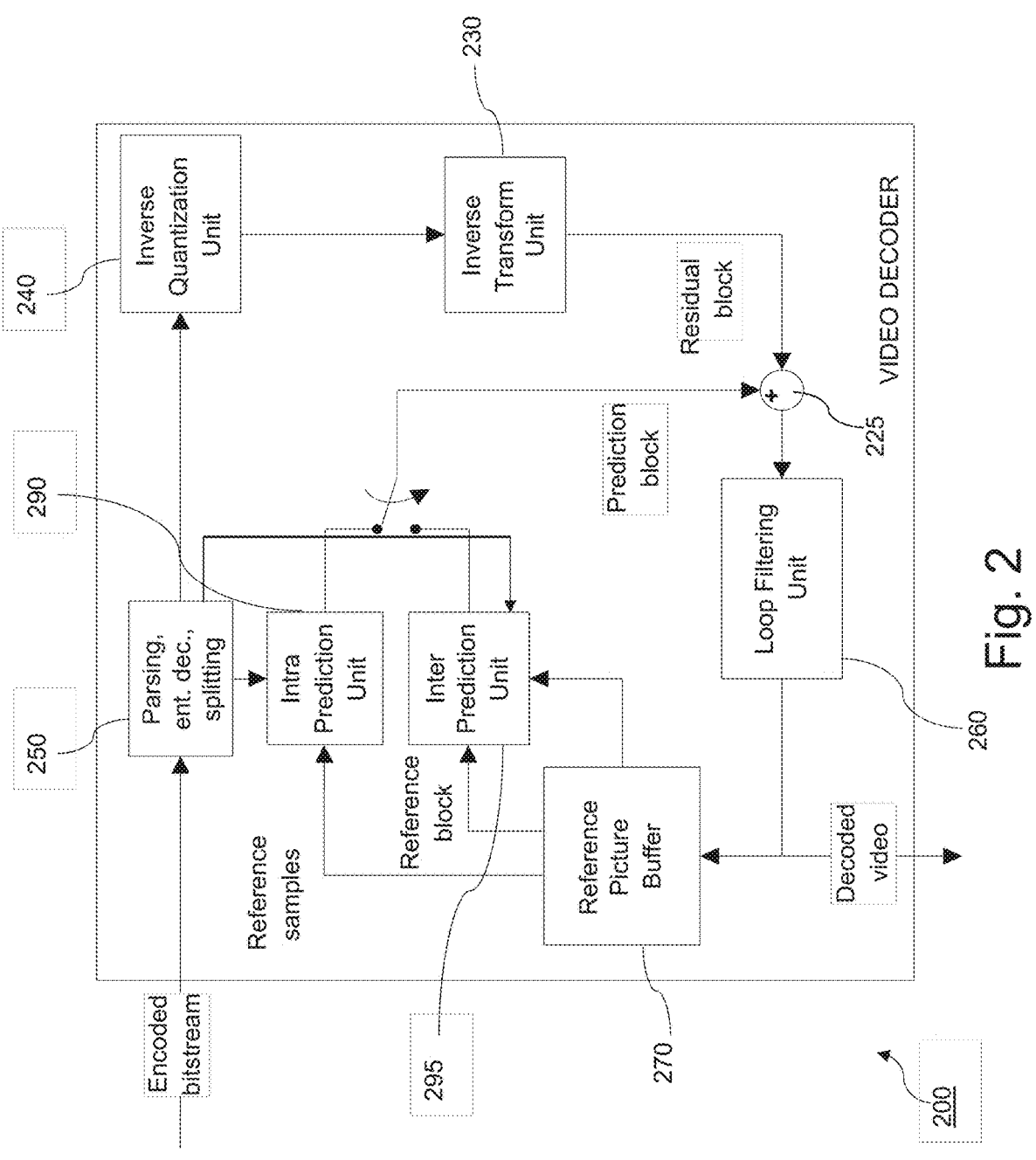
FIG. 2 is a block diagram showing an example structure of a video decoder configured to implement embodiments of the invention.

FIG. 2 shows an example of a video decoder 200. The video decoder 200 comprises particularly a reference picture buffer 270 and an intra-prediction unit 290, which is a block prediction unit. The reference picture buffer 270 is configured to store at least one reference frame reconstructed from the encoded video bitstream. The intra prediction unit 290 is configured to generate a prediction block, which is an estimate of the block to be decoded. The intra prediction unit 290 is configured to generate this prediction based on reference samples that are obtained from the reference picture buffer 270).

The decoder 200 is configured to decode the encoded video bitstream generated by the video encoder 100, and preferably both the decoder 200 and the encoder 100 generate identical predictions for the respective block to be encoded/decoded. The features of the reference picture buffer 270 and the intra prediction unit 290 are similar to the features of the reference picture buffer 170 and the intra prediction unit 190 of FIG. 1.

The video decoder 200 comprises further units that are also present in the video encoder 100 like, e.g., an inverse quantization unit 240, an inverse transform unit 230, and a loop filtering unit 260, which respectively correspond to the inverse quantization unit 140, the inverse transform unit 150, and the loop filtering unit 160 of the video coder 100.

A bitstream parsing, entropy decoding and splitting unit 250 is configured to parse and decode the received encoded video bitstream to obtain quantized residual transform coefficients and signaling information. The quantized residual transform coefficients are fed to the inverse quantization unit 240 and an inverse transform unit 230 to generate a residual block. The residual block is added to a prediction block in a reconstructor 225 and the resulting sum is fed to the loop filtering unit 260 to obtain a decoded video block. Frames of the decoded video can be stored in the reference picture buffer 270 and serve as reference frames for inter prediction. The signaling information parsed and decoded from the bitstream may generally include control information related to frame partitioning. In order to further correctly parse and decode the image, the control information is used to recover splitting of the image into coding units in order to correctly assign the following decoded data to the respective coding units.

Generally, the intra prediction units 190 and 290 of FIGS. 1 and 2 can use reference samples from an already encoded area to generate prediction signals for blocks that need to be encoded or need to be decoded.

The bitstream parsing, entropy decoding and splitting unit 250 receives as its input the encoded bitstream. The bitstream may first be parsed, i.e. the signaling parameters and the residuals are extracted from the bitstream. The syntax and semantic of the bitstream may be defined by a standard so that the encoders and decoders may work in an interoperable manner.

In the HEVC standard, the coding tree units (CTU) or coding unit (CU) which is located on the slice/picture boundaries will be split using forced quad tree splitting (QT) until the right bottom sample of the leaf node is located within the slice/picture boundary. The forced QT partition is not needed to be signaled in the bitstream. The purpose of forced partition is to make the encoding/decoding of the boundary CTU/CU possible by the encoder/decoder. In other words, it is agreed by the encoding side and decoding side that QT splitting used, without the need for further signaling of the splitting mode.

Both in the patent [WO2016090568] with QTBT structure and in VTM-1.0, the boundary CTU/CU forced partition process is inherited from HEVC. This means that CTU/CU located on the frame boundary, and in particular, a CTU/CU through which the boundary runs so that parts of the CTU/CU are outside the picture/frame (in this disclosure, such CTUs/CUs are also referred to respectively as "boundary CTUs" and "boundary CUs"), is first forced partitioned by quadtree (QT) structure without rate-distortion (RD) optimization until the whole current CU lying inside the slice/picture boundary. These forced partitions are no needed to be signaled in the bitstream. Further partitions are possibly achieved based on RD optimization. FIG. 6 shows one forced partition example of the HD (1920×1080 pixels) sequence bottom boundary CTU (128×128) by forced QT.

Since only the QT partition structure is used in boundary partition, the limitation of multi-type tree (BT/TT/ABT) in VTM is indicated from MaxBTTDepth in SPS. Thus, for the partitioning of the boundary CTU (i.e. a CTU having parts on both sides of a boundary, as shown in FIG. 6), the limitation of the total hierarchy depth (TotalDepthLim), i.e. a maximum hierarchy depth, obeys the following Equation (1):

$$TotalDepthLim = QTDepth + MaxBttDepth \qquad (1)$$

In Equation (1). MaxBttDepth is the maximum allowed binary and ternary tree depth, as specified in the SPS. QTDepth is a hierarchy depth of a partitioning block resulting from quad tree partitioning. I.e. for each partitioning step in the hierarchical partitioning where quad tree splitting is applied, the value of QTDepth is increased by one. For instance. QTDepth may correspond to the parameter cqtDepth in the syntax example of Table 1. However, although the QTDepth limit is incremented in each QT partitioning step, the hierarchical depth is eventually limited by a predetermined a minimum allowed CU size (corresponding for example to the SPS parameter minCUSize).

Figure 7:
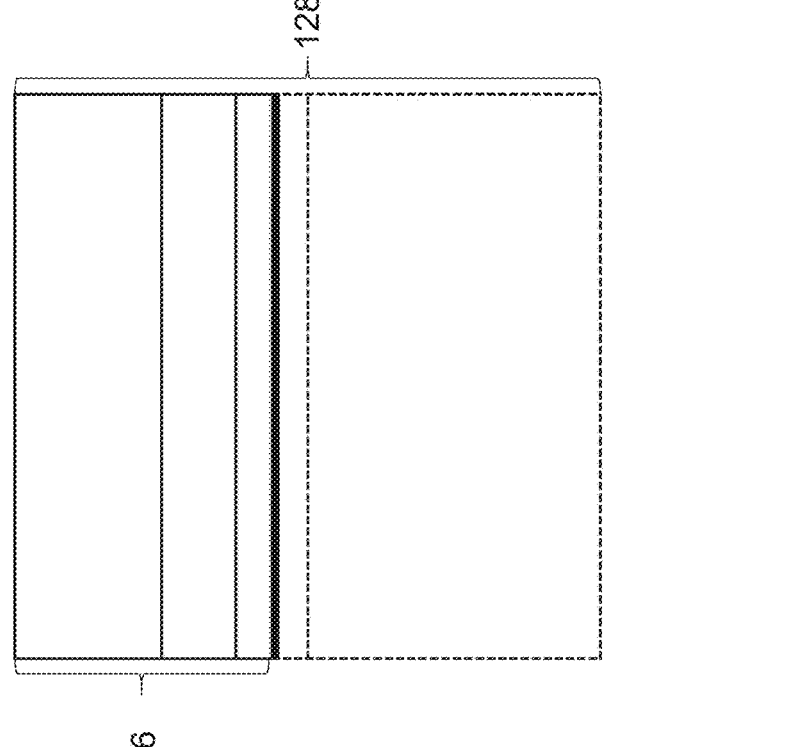
FIG. 7 is a schematic drawing illustrating binary tree splitting of a boundary portion.

Picture boundary may be handled using BT, TT or ABT (asymmetric binary tree). Both forced method and adaptive method may be used. If MTT (multi-type tree) such as BT/TT is used in a boundary partition rather than QT splitting, the limitation of BTT (binary and ternary tree) from SPS MaxBTTDepth is easily exceeded. FIG. 7 is an example of BT used in a HD sequence bottom boundary CTU. If BT is started to be used from CTU level till the leaf node (coding unit) entirely inside of the boundary, there is a depth of 4 is used for BT splitting, which is beyond the MaxBTTDepth from SPS (in VTM-1.0. VVC Test Model version 1.0. MaxBTTDepth is set as 3).

It is an aim of the present disclosure to increase the partition flexibility of the boundary portion and provide a perspective for picture boundary handling. An approach of the present disclosure is to define a Boundary Partition depth limitation besides the prior art MaxBTTdepth from SPS used for partitioning. To this end, rather than MaxBttDepth from Equation (1), a depth value specifically set for boundary partitioning (which may be called e.g. ExtdMaxBTT-Depth). ExtdMaxBTTDepth could be predefined and fixed in SPS and signaled in SPS bitstream or it could be calculated. Accordingly, if multi-type tree (MTT) splitting (such as BT, TT, or ABT) is used in the picture boundary handling (forced or adaptive), the limitation of the maximum MTT depth may be extended both in the decoder and the encoder.

In the following aspects and embodiments of the present disclosure, possible ways of obtaining and calculating the ExtdMaxBTTDepth are described.

Figure 8:
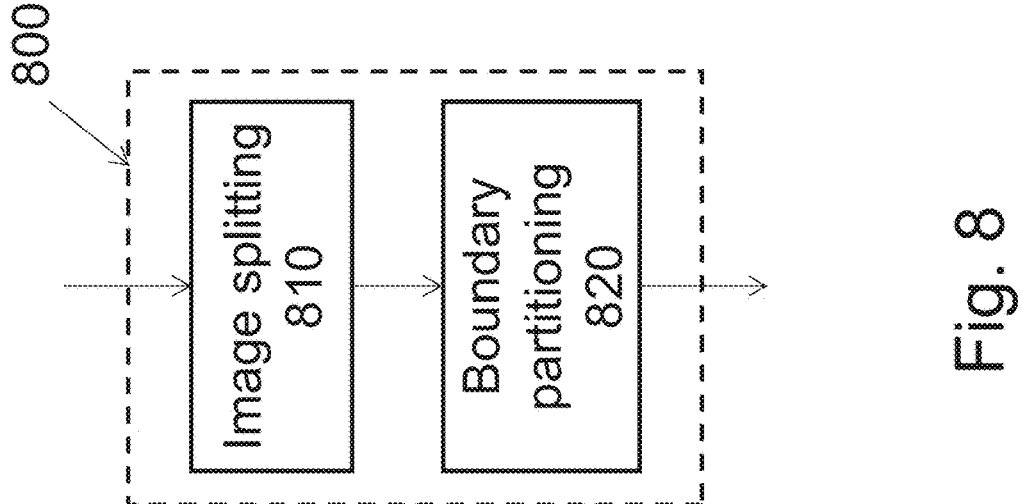
FIG. 8 is a block diagram of an apparatus for splitting an image into coding units.

According to a general aspect, as shown in FIG. 8, an apparatus 800 (which may be implemented in units 110, 250 of an encoder or decoder described above) for splitting an image into coding units is provided. The apparatus includes a processing circuitry which is configured 810 to subdivide the image into coding tree units. CTUs. The CTUs include a non-boundary CTU with a predetermined size in a horizontal and a vertical direction, and a boundary CTU having a portion within the image delimited by a horizontal or vertical image boundary, the portion having a size smaller than the predetermined size in a direction perpendicular to the image boundary. The circuitry is further configured to partition the non-boundary CTU and the boundary CTU into respective coding units. Therein, the hierarchical partitioning of the non-boundary CTU includes multi-type splitting with a maximum non-boundary multi-type partition depth, multi-type splitting being splitting with the splitting direction being either the vertical or the horizontal direction. Moreover, the hierarchical partitioning 820 of the boundary CTU includes multi-type splitting with a maximum boundary multi-type partition depth.

Accordingly, the circuitry of the apparatus 800 for splitting an image into coding units is configured to partition the non-boundary CTU into coding units using a first partitioning depth limit for MTT partitioning steps included in the partitioning, namely the maximum non-boundary multi-type partitioning depth. The circuitry is further configured to partition 820 the boundary CTU into coding units using a second partitioning depth limit, namely the maximum boundary multi-type partitioning depth, for the MTT partitioning included in the partitioning. In other words, according to the present disclosure, the circuitry of the apparatus 800, in operation, uses respective maximum MTT partitioning depths (MTT depth limits) for non-boundary CTUs and boundary CTUs.

The CTUs obtained by the frame splitting 810 may be further hierarchically partitioned, which includes hierarchical partitioning 820 of the boundary CTUs. This partitioning may be performed in any way, for instance as illustrated in FIGS. 3 to 5 and described with reference to them above.

FIG. 8 shows an inner structure of the circuitry of the apparatus 800. This circuitry may be any kind of hardware and software with functional units 810 and 820 for the respective splitting (subdividing) of the image (or frame) into CTUs, partitioning of the CTUs including the non-boundary CTUs and in particular the boundary CTUs. These units may be implemented, for instance, on a single processor. However, the invention is not limited to such application and these units may be implemented by separate hardware parts as well.

In this disclosure, the term "boundary CTU" is used to denote a coding tree unit which is separated by an image boundary into a part in the image which is to be partitioned (within the image boundary), and a part which is not located inside the image (i.e. it lies beyond the image boundary). Boundary CTUs are present if the size of the image to be coded is not an (integer) multiple of the CTU size in at least one direction.

Figure 9:
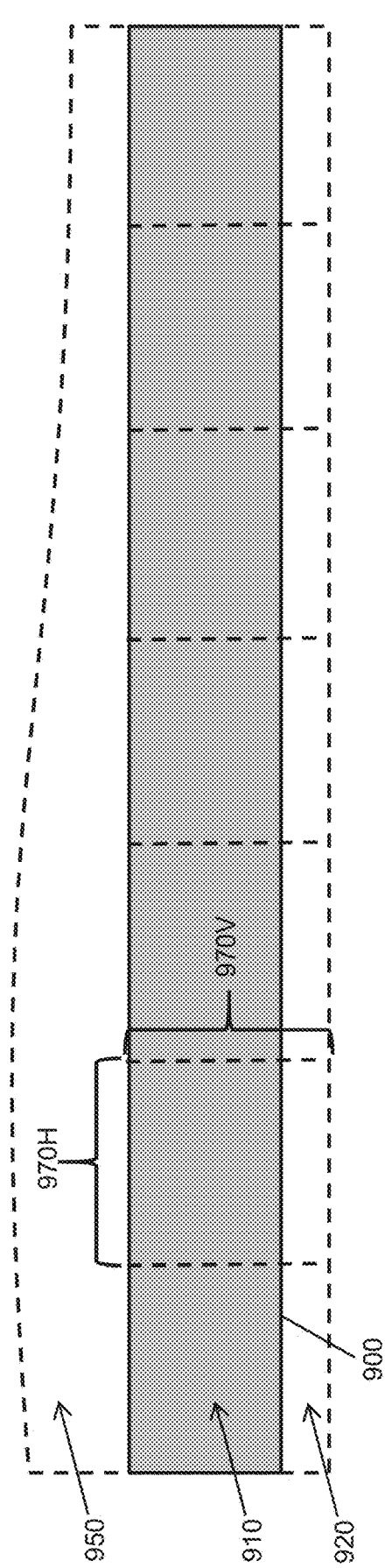
FIG. 9 is a schematic drawing illustrating boundary portion splitting.
Figure 9:
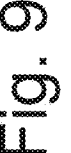

FIG. 9 visualizes an example of a bottom picture boundary 900 and the corresponding boundary portion 910 (shaded) including boundary CTUs. Portion 950 illustrates the remaining portion of the image with size in integer multiple of CTUs vertically and horizontally. Moreover, the vertical size of a CTU is denoted as 970V whereas the horizontal size of the CTU is denoted as 970H. As can be seen in FIG. 9, the boundary portion in this example is an integer multiple of CTU size 970H in horizontal direction. However, in vertical direction, the boundary portion 910 has a size of a remainder after division of the vertical picture size by the vertical CTU size 970V. Portion 920 is only virtual and shows the difference between the height of the boundary portion and CTU size. It is noted that in present implementations the CTU is square so that the sizes 970H and 970V are the same. However, the present disclosure is not limited thereto and the vertical and horizontal sizes of the CTU may differ.

In order to encode (and correspondingly decode) the boundary portion, the boundary portion 910 in FIG. 9 is split into incomplete CTUs, i.e. into CTU portions which have horizontal size of the CTU 970H and vertical size smaller than the CTU size 970V. These incomplete CTUs correspond to the "boundary CTUs" of the present application, and an "incomplete CTU" corresponds to the part of the CTU within the image. Although a horizontal boundary portion is shown in FIG. 9, there may as well, in addition to or instead of the horizontal boundary portion, a vertical boundary portion. In particular, if neither in vertical not in horizontal direction the image size (i.e. the image width and height) is a multiple of the CTU size, there is further an incomplete CTU which is a horizontal boundary as well as a vertical boundary CTU, with vertical and horizontal size of the CTU portion within the image being smaller than the size of a complete CTU.

As opposed to the "boundary CTUs", the term "non-boundary CTU" is used to denote any CTUs that fits completely into the frame or picture, i.e. the CTUs inside portion 950 in the example shown in FIG. 9. I.e., a non-boundary CTU is located inside the image to be encoded/decoded with its complete size in vertical and horizontal direction. However, a non-boundary CTU may be adjacent to at least one image boundary, or they may be further CTUs between the non-boundary CTU and any image boundary.

It is further noted that non-boundary CTUs and boundary CTUs do not constitute different kinds of CTU which differ from each other in how they are coded or specified. The difference between non-boundary CTUs and boundary CTUs is whether they are located on the boundary (i.e. the boundary running through them) or located inside the boundaries delimiting the image.

Moreover, whether or not a CTU is a boundary CTU is determined, for instance, by comparing the position of the CTU (in particular, a suitable pixel position in the CTU) with the position of the boundary (or the vertical/horizontal image size in samples). In the code, the CTU has fixed pre-defined size, for instance 128×128 or 64×64 as in HEVC, as described above. The picture will split into CTUs without overlapping. As a suitable pixel position, the bottom-right corner may be chosen because as it allows determining that a CTU is a boundary CTU with respect to each of a vertical and horizontal picture boundary if the image is processed from left to right and from top to bottom (in general, which pixel position is most suitable will depend on the processing direction). The encoder/decoder will check the bottom-right corner pixel of the CTU and compare it with the vertical and horizontal size of the image. If the bottom-right pixel is located inside of the picture boundary, the CTU is non-boundary CTU, otherwise it's boundary CTU. This way of determining whether a partitioning block is located on a boundary or not is not only applied to CTUs, but can also be used for CUs and any partition blocks resulting from splitting a CTU or some block within the partitioning hierarchy.

Moreover, other ways of determining whether a CTU is a boundary CTU may be used. For instance, as mentioned above, a division of the image size (width/height) by the CTU size can determine the number of CTUs and whether or not there are boundary CTUs in the vertical and horizontal direction. The CTUs may be indexed and if there are boundary CTUs the last k CTUs may be determined to be bottom boundary CTUs, or each k-th CTU may correspond to a right boundary CTU (k being the number of CTUs (including boundary CTUs) per row, i.e. the ceiling of the ratio of image width and CTU size).

The hierarchy depth in hierarchical partitioning has been explained above with respect to FIG. 3. Accordingly, the partition depth corresponds to the number of partitioning steps which are performed to obtain a certain partitioning level, starting from the CTU which has partitioning depth 0 corresponding to level 0 (or layer 0) and reaching down to the depths of the coding units.

For the non-boundary CTUs, the hierarchy depth of coding units is limited in that it cannot exceed a maximum hierarchy depth which follows from settings, such as settings in the SPS. For instance, in the settings, different limits may be set for the respective partitioning depths of quad tree splitting and multi-type splitting. For example, partitioning of a CTU includes, on different levels or in different partial blocks of the same level, both QT splitting and MTT splitting (such as BT, TT, and ABT splitting) as the depth limit may be set separately for the QT partitioning steps and for the MTT splitting. For instance, the maximum non-boundary MTT depth may correspond to the parameter MaxBTTDepth of the current VTM, or it may be redefined and named, for instance. MaxMTTDepth and apply for all MTT splitting types such as BT, TT, etc. Accordingly, the depth limit, i.e. the maximum total depth for CTU splitting, may be a sum of respective depth limits for QT splitting and MTT (e.g. BTT).

On the other hand, for the boundary CTUs, the present disclosure provides a depth limit which is given by the following Equation (2):

$$TotalBPDepthLim = QTDepth + ExtdMaxBTTDepth \qquad (2)$$

As can be seen from Equation (2), the depth limit for boundary CTUs, to which the present disclosure also refers as the boundary partition depth, is generally composed of a depth for QT splitting and a depth for MTT splitting (which is not limited to binary and ternary splitting: the name ExtdMaxBttDepth is to be considered merely as an example). QT depth may be the same QT depth as used in Equation (1) for the case of forced QT splitting. However, Equation (2) differs from Equation (1) by the maximum boundary multi-type partition depth, ExtdMaxBTTDepth (extended maximum binary/ternary tree depth), which may alternatively be called, for example, "ExtdMaxMTTDepth".

In correspondence with the apparatus 800, as a further aspect of the present disclosure, a method is provided for partitioning an image into coding units. The method includes a step of subdividing the image into coding tree units, CTUs. Therein, the CTUs include a non-boundary CTU with a predetermined size in a horizontal and a vertical direction and a boundary CTU having a portion within the image delimited by a horizontal or vertical image boundary, the portion having a size smaller than the predetermined size in a direction perpendicular to the image boundary. The method further includes a step of partitioning the non-boundary CTU and the boundary CTU hierarchically into respective coding units. Therein, the hierarchical partitioning of the non-boundary CTU includes multi-type splitting with a maximum non-boundary multi-type partition depth, multi-type splitting being splitting with the splitting direction being either the vertical or the horizontal direction. The hierarchical partitioning of the boundary CTU includes multi-type splitting with a maximum boundary multi-type partition depth.

In the following, several exemplary embodiments of the present disclosure will be described which further specify both the apparatus 800 for splitting an image into coding units and the corresponding method.

Embodiment 1

As explained above, because the HEVC or the VTM-1.0 use forced QT in the partitioning of boundary CTUs, there is no need to define a separate BTT depth limitation for boundary partitioning. In the HEVC or the VTM-1.0, the parameter MaxBttDepth from equation (1) applies to both boundary and non boundary case.

However, since CE 1 start to involve BT or TT as boundary partition, the limitation for MaxBTTDepth for boundary according to Equation (1) may not be not be suitable, as for reasons explained above in connection with the SubCE2. In Embodiment 1 a new MaxBTTDepth only used for boundary partition when the MTT partition structure is involved in the boundary partition is defined.

The present disclosure provides a definition of a new limitation of boundary partition MTT depth in hybrid video coding. As mentioned, this maximum boundary multi-type partition depth can be either calculated or predefined. The present Embodiment 1 provides some exemplary ways of calculating the maximum boundary multi-type partition depth.

In embodiment 1, the maximum boundary multi-type partition depth is a sum of at least an adaptive boundary multi-type partition depth and a predefined multi-type partition depth. The adaptive boundary multi-type partition depth is a depth of multi-type splitting with splitting direction being the direction of the image boundary.

Accordingly, to preserve the flexibility of boundary block partition, it is proposed to perform a fair handling of the total depth limitation of block located in boundary CTU, wherein the fairness is directly MTT splitting of boundary CTUs as compared to QT splitting in JEM picture boundary handling as defined by Equation (1).

To this end, the maximum boundary MTT partition depth used in Equation (2) is redefined as $$ExtdMaxBTTDepth = BTTBPDepth + MaxBTTDepth. \qquad (3)$$

Therein, the maximum boundary MTT partition depth denoted as ExtdMaxBTTDepth can be derived from equation (1) or (2). Accordingly, the total partitioning depth limit for boundary CTUs is redefined as $$TotalBPDepthLim = QTDepth + (BTTBPDepth + MaxBTTDepth) \qquad (4)$$

In Equations (3) and (4), BTTBPDepth, which is the adaptive boundary multi-type partition depth of the present Embodiment 1, is determined at each layer so that Extd-MaxBTTDepth will also change depending on the partitioning layer, i.e. the layer of the coding block of each partitioning step as well as the layer of the resulting CU to be eventually coded and decoded. For instance, the adaptive boundary multi-type partition depth can be chosen to be the same for different MTT splitting modes such as BT/TT/ABT boundary partitioning. The adaptive boundary multi-type partition depth is re-determined at each partitioning layer (i.e. increased) irrespective of whether on this layer BT, TT, ABT, or some other MTT partitioning type is performed. As in the case of QT splitting, an absolute depth limit may result from a predetermined minimum CU size, for example the SPS parameter minCUSize mentioned above. For a BT partitioning step, the depth is increased by one for each partition block resulting from the step. For TT partitioning, in accordance with VTM-1.0, the depth is increased by one for the resulting ½ size block, and increased by 2 for the ¼ size block, to establish a relationship between the depth and the size of coding units and to ensure compatibility between BT and TT splitting.

As mentioned above, the adaptive multi-type partition depth is a depth with splitting direction being the direction of the image boundary. This means that the splitting line which splits a block on a corresponding layer into two, three or more blocks of the subsequent deeper layer, has the same direction, i.e. is parallel to, the image boundary under consideration which runs through the boundary CTU to be split. However, splitting/partitioning steps with a splitting direction perpendicular to the picture boundary under consideration do not contribute to the value of the adaptive multi-type partition depth. In particular, if the picture boundary is a horizontal boundary, only steps with horizontal splitting direction will be counted by the adaptive multi-type partition depth. Otherwise, if the picture boundary is a vertical boundary, only steps with splitting direction being vertical will be counted. This will be seen in the partitioning examples shown FIGS. 10 and 11.

However, the present disclosure is also applicable to boundary CUs and boundary partition blocks within the partitioning hierarchy of a boundary CTU which are located both on a horizontal/e.g. bottom) and vertical boundary (e.g. right) boundary, for example a bottom-right CTU. In this case, steps MTT steps of both splitting directions will be counted, either by the term BTTBPDepth in Equation (3) or by separate respective variables.

On the other hand, as can be seen from Equations (3) and (4), the non-adaptive term (i.e. the predefined multi-type partition depth) in the maximum boundary multi-type partition depth may, for example, be the equal to the the maximum non-boundary multi-type partition depth. However, the present disclosure is not limited thereto. For instance, in cases where an additional predefined multi-type boundary partition depth parameter is to be defined, it may be beneficial to set this parameter to a smaller value (e.g. to save one or more bits).

Figure 10:
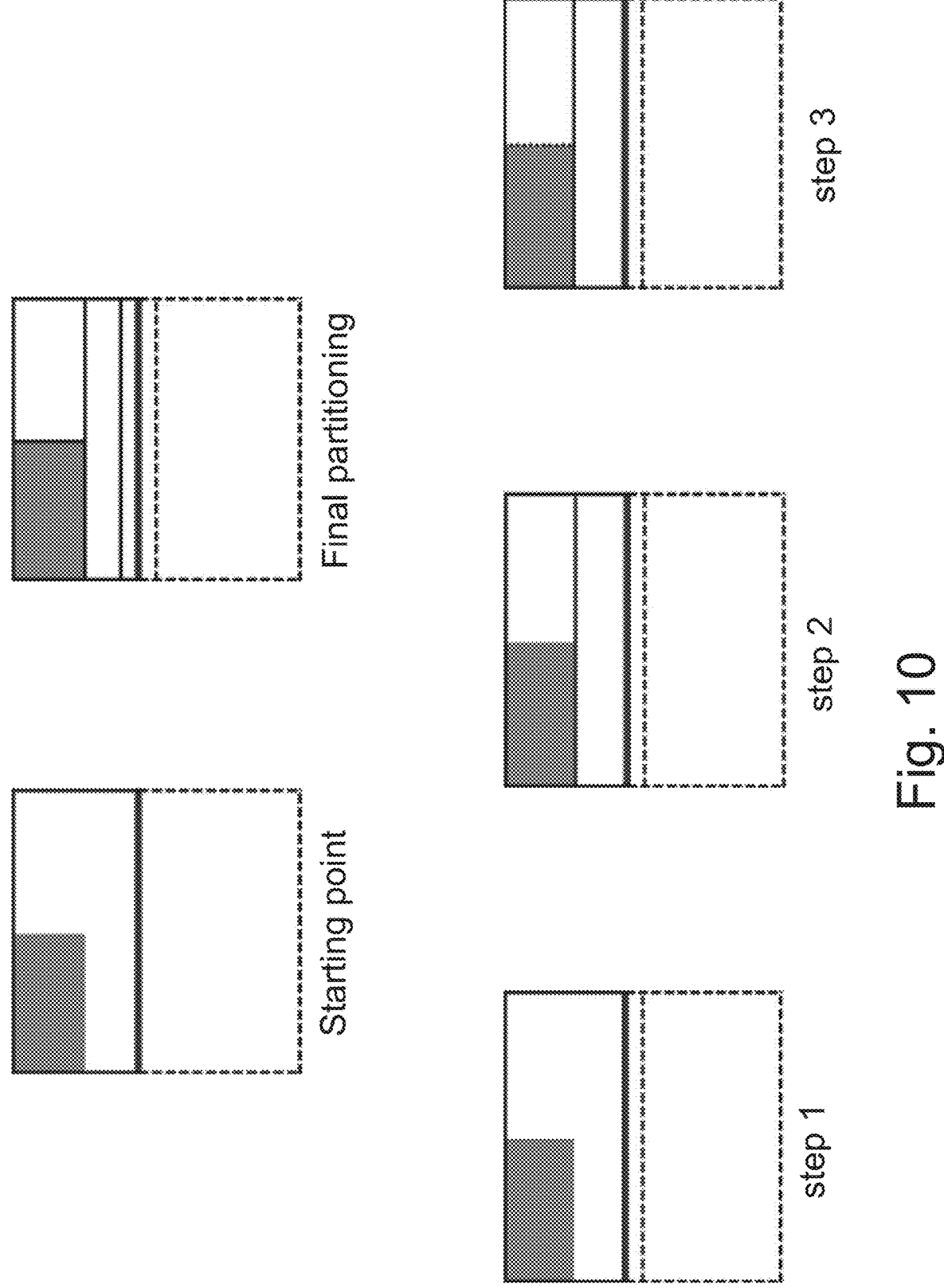
FIG. 10 is a diagram showing an example of boundary partitioning using binary tree splitting.

FIG. 10 shows a first example of boundary partitioning using binary tree partitioning, in particular an example of bottom boundary partitioning using BT. The starting point shown in the left-hand side of the top half of the Figure shows a boundary CTU and the bottom picture boundary (thick solid line) running through the boundary CTU. Moreover, there is a marked block object in the top right corner of the CTU which is to be obtained by image splitting. The right-hand side of the top half of the Figure shows the final partitioning (i.e. partitioning pattern) into which the boundary CTU is to be partitioned. However, in this first example as well as in the example shown in FIG. 10, only the MTT (in particular BTT) partitioning steps are considered. QT splitting may be performed in further steps preceding the MTT partitioning steps, in compliance with Equation (4). Accordingly, the starting point need not necessarily be a CTU, but may also be, for example, a square-shaped coding block (vertical and horizontal sizes being equal) of some depth greater than 0 resulting from QT splitting.

The partitioning steps 1 to 3 of partitioning the boundary CTU from the starting point to the final partitioning are shown in the bottom half of FIG. 10. Therein, thick solid are the picture boundary. BTT boundary as well as the CTU partitions are shown as solid (inside boundary) or dashed (outside of boundary) lines, the dotted line (in step 3) is BTT "normal" partition (i.e. a partition which is perpendicular is not a boundary partition with splitting direction being the direction of the image boundary). If the MaxBTTDepth (the limit being 3 in VTM) was used in accordance with Equation (1), the object block in the top right of the CTU could not be further partitioned, because there are 3 MTT partitioning steps, and thus CurrentBTTDepht (3)>=MaxBTTDepth (3) (CurrentBTTDepth is the depth of BTT partitioning in the current step corresponding to the number of steps in which BTT partitioning is performed).

According to Embodiment 1, in step 1, there is one layer of (BTT) boundary partitioning (i.e. partitioning with the splitting direction being the direction of the boundary). Accordingly. BTTBPDepth=1. Thus, from Equation (3), one obtains ExtdMaxBTTdepth=BTTBPDepth+MaxBTT-Depth=1+3=4 (MaxBTTDepth is set to 3 in SPS). The maximum BTT depth layer (maximum boundary multi-type partition depth) for step 1 is 4 and since the block has been already partitioned once, the partitioned block can be further MTT partitioned further three times according to the Extd-MaxBTTdepth set in step 1 in accordance with the maximum boundary multi-type partition depth.

In step 2, there are two layers of boundary partitioning obtained by the BP (boundary partitioning) performed so far. BTTBPDepth=2. Thus, from Equation (3), one obtains ExtdMaxBTTdepth=BTTBPDepth+MaxBTTDepth=2+3=5 (MaxBTTDepth is set to 3 in SPS). The new maximum BTT depth layer (maximum boundary multi-type partition depth) for step 2 is 5. (calculated from the starting point (a)) and since the block has been already partitioned twice, the partitioned block can be further partitioned 3 times in accordance with the maximum boundary multi-type partition depth. It can be seen that since a boundary partitioning (i.e. splitting direction being horizontal, the same direction as the image boundary direction), the BTTBPDepth, and accordingly. ExtdMaxBttDepth has been increased by one from step 1 to step 2.

In step 3, a further BT partitioning has been performed. However, this last partitioning has the splitting direction not being the direction of the image boundary, in particular, the splitting direction in step 3 is perpendicular to the image boundary. For this reason step 3 does not contribute to the value of BPPBPDepth. Therefore, there are still 2 layers of BTT BP, and BTTBPDepth=2. As follows. ExtdMaxBTTdepth=BTTBPDepth+MaxBTTDepth=2+3=5 (MaxBTTDepth is set to 3 in SPS). As explained, in the adaptive multi-type partition depth, only the depth (number of steps/layers) where multi-type splitting with splitting direction being the image boundary direction contribute. However, the maximum boundary multi-type partition depth is a limit for any MTT boundary partitioning. Therefore, the maximum depth layer for step 3 remains 5 (calculated from the starting point), and since the block has been already partitioned 3 times (here all the partitions are considered and not only the BPs), the partitioned block can be further be BTT partitioned 2 times.

Figure 11:
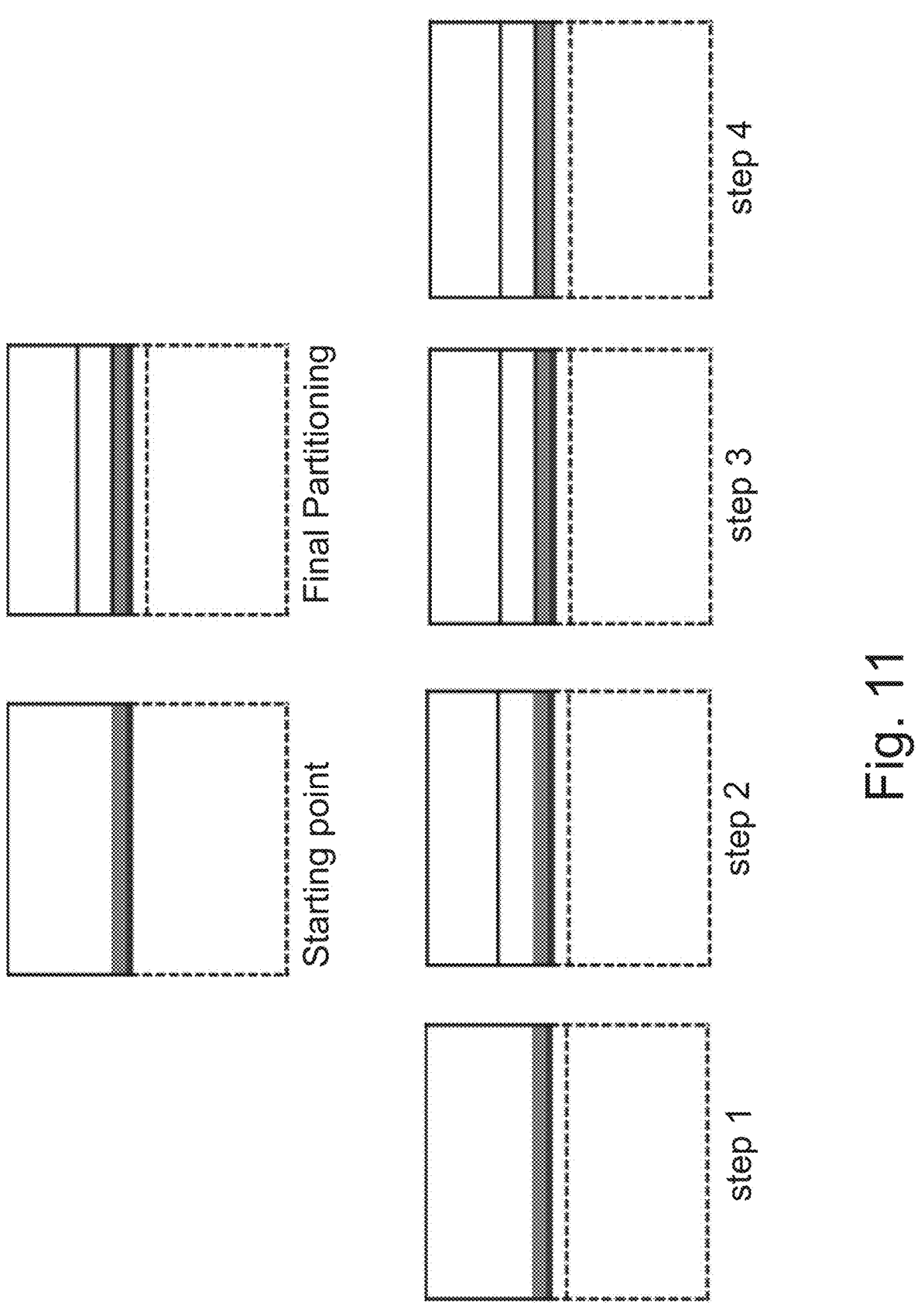
FIG. 11 is a diagram showing a further example of boundary partitioning using binary tree splitting.

A second example of the maximum MTT partition depth calculation is shown in FIG. 11. In the figure, thick solid lines are picture boundary, solid (inside) or dashed (outside) line are CTU borders or BTT boundary partition, in the same way as in FIG. 10. There is the marked objective located inside of boundary CTU (i.e. the target coding block to be obtained by MTT splitting). In order to obtain the final partition pattern of the top-right part of the figure, four steps of partitioning need performed as shown in figure steps 1-4.

If MaxBTTDepth is used in accordance with Equation 1 and limited as 3 as in VTM, the marked target block (of MTT depth 4) cannot be obtained and cannot be further partitioned, because CurrentBTTDepht (4)>=MaxBTT-Depth (3).

In step 1 of FIG. 11, there is 1 layer of BTT BP. BTTBPDepth=1. Accordingly. ExtdMaxBTTdepth=BTTBPDepth+MaxBTTDepth=1+3=4 (MaxBTTDepth is set to 3 in SPS). The maximum BTT depth layer for step 1 is 4, and since the block has been already partitioned once, the partitioned block can be further BTT partitioned 3 times.

In step 2 of FIG. 11, there are 2 layers of BTT BP. BTTBPDepth=2. Accordingly. ExtdMaxBTTdepth=BTTBPDepth+MaxBTTDepth=2+3=5. The maximum BTT depth layer for step 2 is 5, and since the block has been already partitioned once, the partitioned block can be further BTT partitioned 3 times.

In step 3 of FIG. 11, there are 3 layers of BTT BP. BTTBPDepth=3. Accordingly. ExtdMaxBTTdepth=BTTBPDepth+MaxBTTDepth=3+3=6. The maximum BTT depth layer for step 2 is 6, and since the block has been already partitioned once, the partitioned block can be further BTT partitioned 3 times.

Moreover, in step 4, there are 4 layers of BTT partitioning. ExtdMaxBTTdepth=BTTBPDepth+MaxBTT-Depth=4+3=7. The maximum depth layer for step 4 is 7 (calculated from the starting point (a)) and since the block has been already partitioned 4 times, the partitioned block can be further partitioned max 3 times.

In the maximum boundary multi-type partition depth, all the partitions are considered and limited and not only the BPs with splitting direction being the direction of the boundary. However, in all for steps of the example shown in FIG. 11, multi-type splitting is performed with the splitting direction being the direction of the image boundary. Accordingly, in each of these steps, the value of the adaptive boundary multi-type partition depth (BTTBPDepth in this example) is increased by 1.

By adapting the depth limitation for boundary multi-type partitioning to the number of partitioning steps where the splitting direction is the same direction as the boundary, the present disclosure facilitates a partitioning pattern of coding units that approximate a remaining portion of the CTU in the vicinity of the image boundary more practically. In particular, in contrast to using only QT splitting, the number of coding units in the boundary CTU/portion may be reduced.

Embodiment 2

According to Embodiment 1 explained above, the maximum boundary multi-type partition depth (for example given as ExtdMaxBTTDepth) is a sum of at least an adaptive boundary multi-type partition depth and a predefined multi-type partition depth. Now, according to the present Embodiment 2, this sum further includes a function of a ratio of sizes in the direction of the image boundary and the direction perpendicular to the image boundary of a boundary partition block of the boundary CTU. Therein, the boundary partition block is a block of the adaptive boundary multi-type partition depth.

In the present disclosure, the term "partition block" refers to a CTU or a block which results from splitting a block/unit of a lower level. Accordingly, partition blocks are not limited to CTUs at the top of hierarchical splitting or coding units which are the final result of the hierarchical partitioning to be encoded/decoded, but also include blocks that are obtained in intermediate splitting steps, such as steps 1 and 2 in FIG. 10, or steps 1 to 3 in FIG. 11. Moreover, a "boundary partition block" is a partition block located on the image boundary (the image boundary running through the block), in the same way as a boundary CTU is located on the boundary.

If the boundary under consideration is a horizontal image boundary, the above mentioned ratio in sizes is the ratio of the horizontal size (width) of the boundary partition block divided and the vertical size (height). On the other hand, if the image boundary is vertical, the ratio is the height divided by the width of the boundary partition block.

For instance, the function of the ratio may be the binary logarithm, $\log_2$ Ratio. In Embodiment 1, the total depth limitation is considered as a criterion of define the BTT limitation for boundary blocks. Embodiment 2, in comparison with the calculation of the MTT BP depth limit using Equation 1, particularly considers the reachable size of coding unit as a fairness criterion (i.e. fairness between QT and MTT splitting). Accordingly, the maximum boundary multi-type partition depth is extended according to the following equation (5).

$$ExtdMaxBTTDepth = \log_2 \text{Ratio} + BTTBPDepth + MaxBTTDepth, \quad (5)$$

wherein Ratio denotes the width height ratio (width/height if the boundary is horizontal or height/width of the boundary is vertical).

Figure 12:
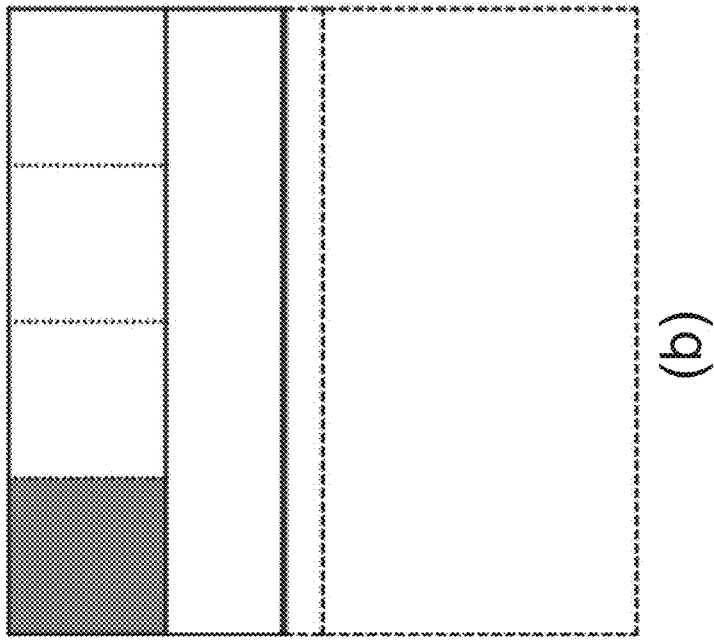
FIG. 12 is a diagram showing an comparison of boundary partitioning using quad tree splitting and binary tree splitting.
Figure 12:
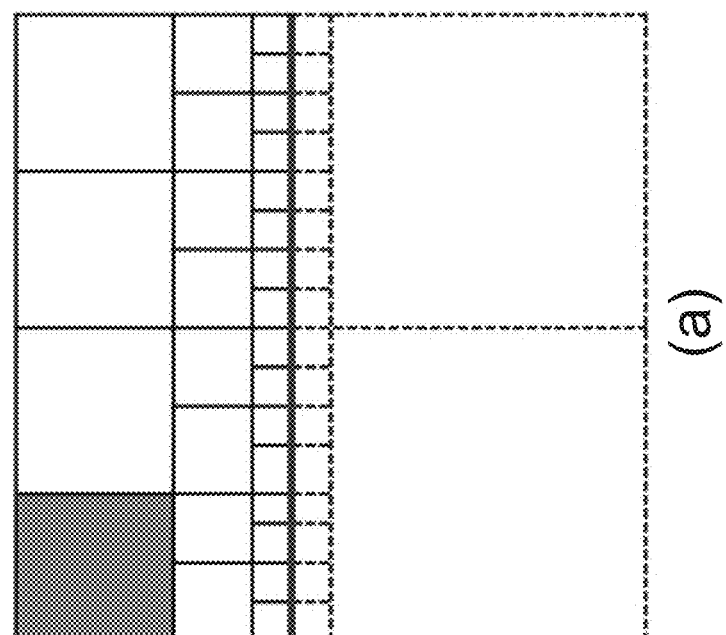

An example of boundary partitioning in accordance with Embodiment 2 is shown in FIG. 12. Figure part (a) shows boundary partitioning of VTM-1.0 using forced QT while FIG. 1, part (b) is the boundary partition using BT. As in FIGS. 10 and 11, solid (inside of boundary). The dashed lines show the CTU and the boundary partitioning (splitting direction is boundary direction), the dotted lines show partitioning with the splitting direction not being the same as the boundary direction. In FIG. 12, part (a), the marked block in the top-left of the CTU can possibly be further split in 3 additional levels of BT because the MaxBTTDepth from SPS is set as 3 in the configuration of the VTM-1.0, and no BT splitting has been performed so far. In part (b), it is also possible to partition the marked block in the top-left of the CTU in further 3 levels of BT (or other MTT types), therefore, the ExtdMaxBTTDepht of the marked block is obtained from Equation (5) as:

$$ExtdMaxBTTDepth = \log2(\text{boundary partition block ratio (4)}) +$$
$$BTTBPdepth(2) + MaxBTTDepth(3) = 7$$

In the case of the current Embodiment 2 shown in part (b) of FIG. 12, in accordance with the ExtendedMaxBTTDepth which denotes the maximum boundary multi-type partition depth, the marked block may possibly be split further 3 levels of BT (ExtdMaxBTTDepht (7)–CurrentBTDepht (4))=3.

Herein, it is assumed that the marked block has been obtained by two BT partition steps with the splitting direction being the boundary direction, followed by two BT steps with the splitting direction being perpendicular to the boundary partition, the resulting current BT depth being equal to 4. However, the present disclosure is not limited to the MTT splitting being BTT splitting. For instance, a split mode may further be used in which four partition blocks are obtained in a single step where a partition block is split three or more times in the same splitting direction (such a split mode where four partitioning blocks are obtained is sometimes called SplitInto4, which is different from QT splitting although four partition blocks are obtained as well in one step). If, in the example of FIG. 12, the last two BT splitting steps are replaced by one SplitInto4 splitting step, the resulting current MTT depth is 3 rather than 4.

Moreover, in MTT, the counted hierarchy depth may be determined with respect to the resulting block size of the smallest resulting partition. For instance, in the current TT implementation in VTM-1.0, a block is split into ¼, ½, and ¼ subblocks/partition blocks. For the first and third partition block, the depth is counted twice in VTM-1.0 to make sure that the depth is equally valid for both BT and TT (also, an ABT step may be counted twice for the smaller one of the resulting partition blocks). Accordingly, also a single SplitInto4 step may be counted as two steps to ensure compatibility with BT splitting. In this manner, the resulting block size of a partition block/coding unit can be seen from the depth. However, in some other possible method, each step may be counted once, if it is ensured, e.g. from some variable, that the respective partitioning type is known.

It is noted that in Equation (5), the binary logarithm of the boundary partition block ratio may (first term) on the right side may be the same as the MTT BP depth (second term), in particular if BT partitioning is applied (as shown in FIG. 12, part (b)).

It is further noted that the present disclosure is not limited to the function of the boundary partition block being the binary logarithm. For instance, the ration itself (identity function) may be used, or the ratio may for instance be multiplied with a constant or some adaptive parameter.

Embodiment 3

In the above-described Embodiments 1 and 2, it has been described how the maximum boundary multi-type partition depth can be calculated. On the other hand, in the present Embodiment 3, the maximum boundary multi-type partition depth is predefined (i.e., it is fixed). A predetermined value may be provided as the term BTTBPDepth in Equation (4), or it may replace the MaxBttDepth in an Equation like Equation (1) for boundary CTUs.

For instance, such a fixed maximum boundary multi-type partition depth may be obtained from signaling in the bitstream. For example, it may be signaled within a set of control parameters common for one or more video frames such as PPS. SPS, VPS in HEVC. It may be also signalled once per entire video sequence. The signaling may include further coding of the parameter such as differential coding, predictive coding, entropy coding or any other embedding into the bitstream.

However, as described, the present disclosure including the above Embodiments 1 to 3 is not limited to the maximum boundary multi-type partition depth being fixed and signaled in the bitstream. It may also be derived, e.g. based on one or more parameters which are conveyed in the bitstream (such as MaxBTTDepth in the SPS) and/or on internal variables such as BTTBPDepth or QTDepth mentioned above. However, derivation may also be based on a predefined relation in a standard or signalled.

Although the description of some examples (including Equations 1 to 5) refers to BTT partitioning and the variable are named accordingly (e.g. BTTBPDepth: MaxBTTDepth), the present disclosure is also applicable to other types of MTT partitioning such as ABT (asymmetric binary partitioning) partitioning (partitioning block is partitioned in one partitioning step into two or more partition blocks having different sizes, such as ¼ and ¾), or the SplitInto4Mode mentioned in connection with FIG. 12, part (b). Thus, the variables may be named differently, for instance BTTBPDepth: MaxBTTDepth, etc. Accordingly, the present invention facilitates providing flexibility for picture boundary handling using alternative multi-type split modes in addition to QT splitting, irrespective of the particular MTT split mode which is used.

However, in some embodiments, in addition to the MTT splitting, the hierarchical splitting of the boundary CTU (as well as the hierarchical splitting of the non-boundary CTU) may further include QT splitting. This can be seen from Equation (4) which defines a total maximum boundary partition depth as a sum of the maximum boundary multi-type partition depth (the term in parentheses) and a QT partition depth (internal variable QTDepth). For instance, as is already the case in VTM-1.0, the quaternary splitting may be performed before the MTT splitting. I.e. QT splitting steps are performed, followed by MTT splitting steps. However, the present disclosure is not limited thereto, but it is also applicable to a configuration in which QT splitting is performed after MTT splitting. Accordingly, as has been mentioned, the starting point in FIGS. 10 and 11 need not be a CTU, but can also be a partition block obtained from one or more previous partitioning steps.

Moreover, according to the present disclosure, the maximum boundary multi-type partition depth may be equal to or greater than the maximum non-boundary multi-type partition depth. For instance, the maximum boundary multi-type partition depth may be equal to the maximum non-boundary multi-type partition depth if, in the boundary CTU no multi-type splitting with splitting direction being the direction of the boundary is performed. In this case, there is no partitioning step in which the internal variable BTTBPDepth (or MTTBPDepth) is incremented. Still, the apparatus for splitting an image into coding units performs determining of the non-boundary multi-type partition depth and the maximum boundary multi-type partition depth in the respectively different ways, as described.

However, in Embodiment 3 where the maximum boundary multi-type partition depth is predetermined, its predetermined value shall be greater than the maximum non-boundary multi-type partition depth, in order to allow a greater flexibility for MTT partitioning in boundary CTUs.

Figure 13:
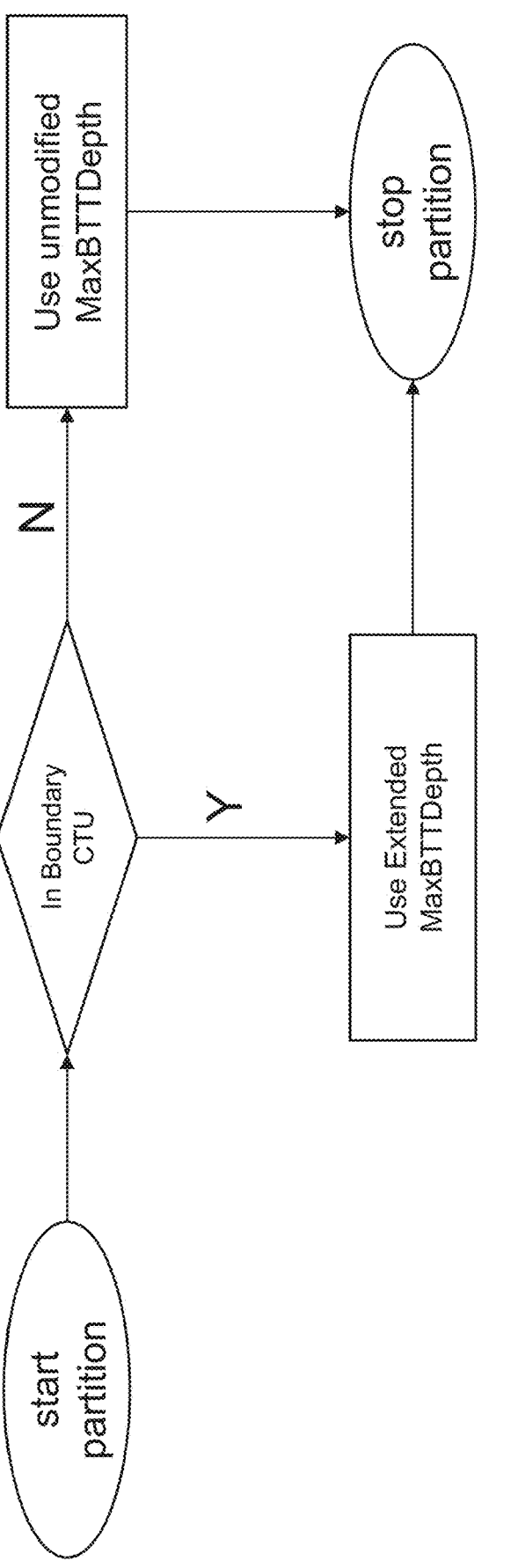
FIG. 13 is a flow chart showing an implementation of maximum multi-type tree depth extension.

A flowchart of a maximum BT/TT (or MTT in general) depth extension of the present disclosure is shown in FIG. 13. The conditional "In boundary CTU" indicates a condition whether or not the current CTU/CU is located inside of a boundary located CTU. If the condition is false (N), the normal MaxBTTDepth from the SPS is used as the non-boundary multi-type partition depth to limit the maximum possible BT/TT (or other MTT) depth. Otherwise the MaxBttdepth will be extended and determined in accordance with any of the embodiments of the present disclosure.

As mentioned, the apparatus 800 for splitting an image may be embedded in a video encoding apparatus 100 or decoding apparatus 200 as illustrated in FIGS. 1 and 2. Accordingly, the present invention further provides an apparatus 100 for encoding an image of a video sequence, i.e. an encoding apparatus. The encoding apparatus 100 comprises the apparatus 800 for splitting an image according to any of the embodiments described in the present disclosure, an image coding unit to encode the coding units, and a bitstream forming unit configured to generate a bitstream including the encoded coding units and a partitioning information indicating how the coding tree units are partitioned.

In particular, the partition information may comprise, for each CTU or for partitioning blocks in intermediate steps, an information indicating which partitioning type mode from among QT and the several MTT split modes is applied. For instance, for each split of a partition block or CTU, a parameter indicating the split mode may be included in the bitstream. Alternatively, a particular split mode may be used by force.

It is noted that the partitioning mode for the boundary CTUs and the non-boundary CTUs may differ. For instance, as exemplified above, the partitioning mode can be signalled on a CTU basis for both boundary and non-boundary CTUs (and/or on a partition block basis). Alternatively, the partitioning mode for all CTUs on a certain boundary (vertical or horizontal) may be the same and set within a signalling related to one or more video pictures.

However, the partitioning mode of the boundary CTUs may be determined in a way different from the partitioning mode of the non-boundary CTUs. For example, for the boundary CTUs (and partition blocks) a pre-determined partitioning mode may be forced, i.e. standard may define fixed partitioning mode or an algorithm for determining the partitioning mode for the boundary CTUs, for instance based on their location within the boundary and/or size and/or the partitioning mode of the neighboring CTUs.

Correspondingly, the present disclosure further provides a method for encoding an image of a video sequence. The method comprises the steps of the method of splitting an image according to any of the embodiments described in this disclosure, an image coding step of encoding the coding units, and a bitstream forming step of generating a bitstream including the encoded coding units and a partitioning information indicating how the coding tree units are partitioned.

Also provided is are an apparatus 200 and a method for decoding an image of a video sequence. If embedded in the decoding apparatus 200, the apparatus 800 is used for determining splitting of a (decoded) image into coding units. The decoding apparatus 200 includes a bitstream parser for parsing a bitstream including encoded coding units, the apparatus 800 for determining splitting of an image according to any of the embodiments, and an image decoding unit for decoding the encoded coding units based on the determined splitting of the image.

Correspondingly, the method for decoding an image includes a step of parsing a bitstream including the encoded coding units: the steps of determining splitting of an image according to any of the embodiments of the present disclosure, and an image decoding step of decoding the encoded coding units based on the determined splitting of the image.

At the decoder side, the maximum BT/TT depth will be extended on the boundary CTUs/CUs, i.e. the maximum boundary multi-type partition depth will be used for boundary CTUs to be decoded. The extension could be simply parsed from the SPS or derived based on certain condition. Based on the Embodiment 1, the maximum BTT depth could be extended with the BTT boundary partition depth. And based on Embodiment 2, the maximum BTT depth could be extend with the Ratio of boundary partition block and the BTT boundary partition depth.

If, in the encoding and decoding of the video image by the encoder/decoder and by the respective encoding/decoding method, the splitting (or determining of splitting) is performed according to Embodiment 3, the maximum boundary multi-type partition depth being predefined. In this case, the encoded/decoded bitstream may further include an encoded sequence parameter set including the maximum boundary multi-type partitioning depth. On the decoder side, the apparatus 800 for determining splitting of an image then may be further configured to obtain the second maximum multi-type partitioning depth from the sequence parameter set.

Figure 14:
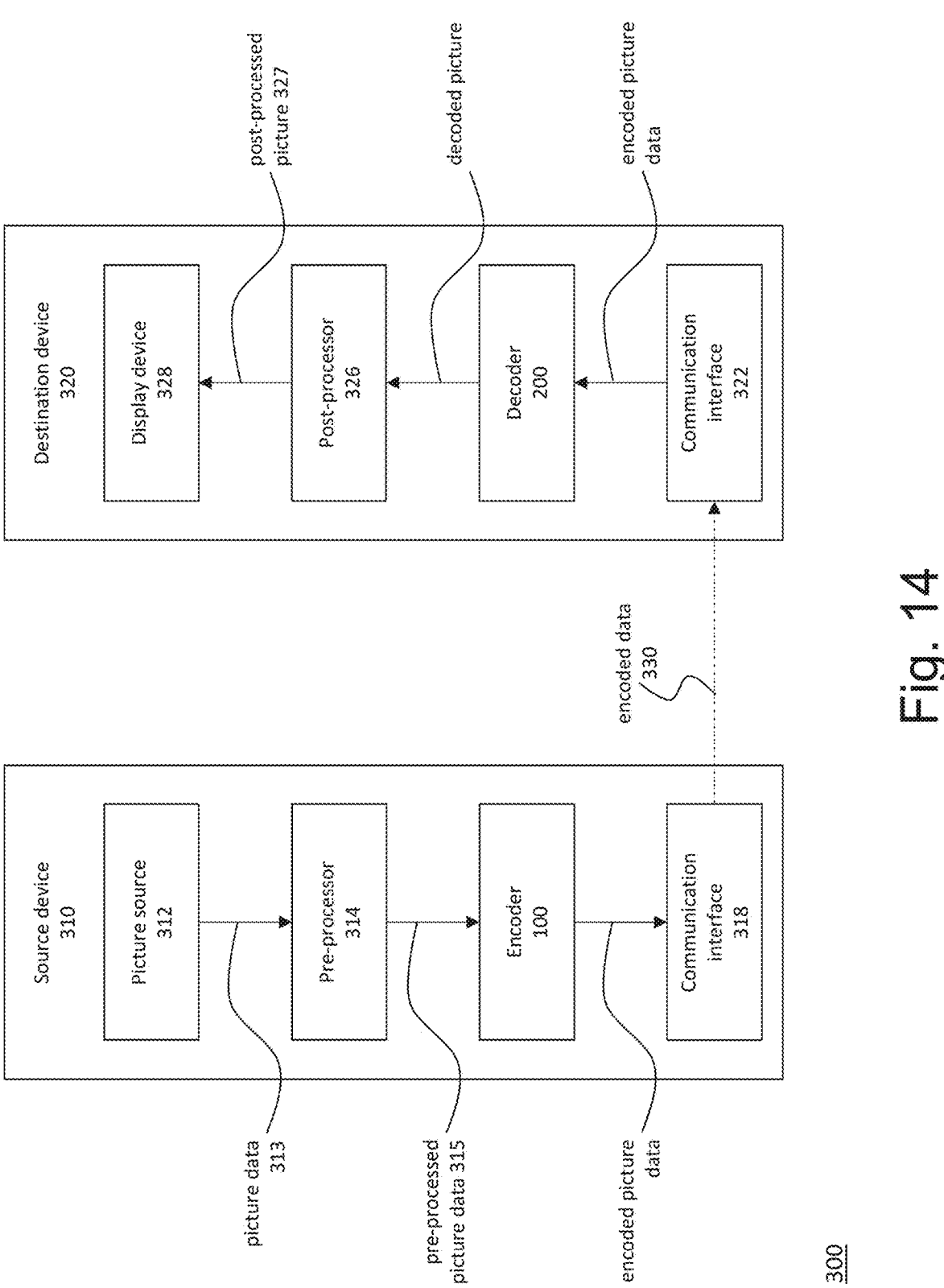
FIG. 14 is a block diagram showing an example of a video coding system configured to implement embodiments of the invention.

FIG. 14 is a conceptual or schematic block diagram illustrating an embodiment of a coding system 300, e.g. a picture coding system 300, wherein the coding system 300 comprises a source device 310 configured to provide encoded data 330, e.g. an encoded picture 330, e.g. to a destination device 320 for decoding the encoded data 330.

The source device 310 comprises an encoder 100 or encoding unit 100, and may additionally, i.e. optionally, comprise a picture source 312, a pre-processing unit 314, e.g. a picture pre-processing unit 314, and a communication interface or communication unit 318.

The picture source 312 may comprise or be any kind of picture capturing device, for example for capturing a real-world picture, and/or any kind of a picture generating device, for example a computer-graphics processor for generating a computer animated picture, or any kind of device for obtaining and/or providing a real-world picture, a computer animated picture (e.g. a screen content, a virtual reality (VR) picture) and/or any combination thereof (e.g. an augmented reality (AR) picture). In the following, all these kinds of pictures and any other kind of picture will be referred to as "picture" or "image", unless specifically described otherwise, while the previous explanations with regard to the term "picture" covering "video pictures" and "still pictures" still hold true, unless explicitly specified differently.

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RBG format or color space a picture comprises a corresponding red, green and blue sample array. However, in video coding each pixel is typically represented in a luminance/chrominance format or color space, e.g. YCbCr, which comprises a luminance component indicated by Y (sometimes also L is used instead) and two chrominance components indicated by Cb and Cr. The luminance (or short luma) component Y represents the brightness or grey level intensity (e.g. like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array.

The picture source 312 may be, for example a camera for capturing a picture, a memory, e.g. a picture memory, comprising or storing a previously captured or generated picture, and/or any kind of interface (internal or external) to obtain or receive a picture. The camera may be, for example, a local or integrated camera integrated in the source device, the memory may be a local or integrated memory, e.g. integrated in the source device. The interface may be, for example, an external interface to receive a picture from an external video source, for example an external picture capturing device like a camera, an external memory, or an external picture generating device, for example an external computer-graphics processor, computer or server. The interface can be any kind of interface, e.g. a wired or wireless interface, an optical interface, according to any proprietary or standardized interface protocol. The interface for obtaining the picture data 313 may be the same interface as or a part of the communication interface 318. The communication interfaces may be any interfaces such as Ethernet, WLAN, Bluetooth, LTE, or any wired or unwired interface such as satellite or optical interfaces. The transmission may be peer-to-peer or broadcast or multicast.

In distinction to the pre-processing unit 314 and the processing performed by the pre-processing unit 314, the picture or picture data 313 may also be referred to as raw picture or raw picture data 313.

Pre-processing unit 314 is configured to receive the (raw) picture data 313 and to perform pre-processing on the picture data 313 to obtain a pre-processed picture 315 or pre-processed picture data 315. Pre-processing performed by the pre-processing unit 314 may, e.g., comprise trimming, color format conversion (e.g. from RGB to YCbCr), color correction, or de-noising.

The encoder 100 is configured to receive the pre-processed picture data 315 and provide encoded picture data (further details have been described, e.g., based on FIG. 1).

Communication interface 318 of the source device 310 may be configured to receive the encoded picture data and to directly transmit it to another device, e.g. the destination device 320 or any other device, for storage or direct reconstruction, or to process the encoded picture data for respectively before storing the encoded data 330) and/or transmitting the encoded data 330 to another device, e.g. the destination device 320 or any other device for decoding or storing.

The destination device 320 comprises a decoder 200 or decoding unit 200, and may additionally, i.e. optionally, comprise a communication interface or communication unit 322, a post-processing unit 326 and a display device 328.

The communication interface 322 of the destination device 320 is configured receive the encoded picture data or the encoded data 330, e.g. directly from the source device 310 or from any other source, e.g. a memory, e.g. an encoded picture data memory.

The communication interface 318 and the communication interface 322 may be configured to transmit respectively receive the encoded picture data or encoded data 330 via a direct communication link between the source device 310 and the destination device 320, e.g. a direct wired or wireless connection, or via any kind of network, e.g. a wired (such as optical, power-line, cooper, coaxial, or based on any other media) or wireless network or any combination thereof, or any kind of private and public network, or any kind of combination thereof.

The communication interface 318 may be, e.g., configured to package the encoded picture data into an appropriate format, e.g. packets, for transmission over a communication link or communication network, and may further comprise data loss protection and data loss recovery.

The communication interface 322, forming the counterpart of the communication interface 318, may be, e.g., configured to de-package the encoded data 330 to obtain the encoded picture data and may further be configured to perform data loss protection and data loss recovery, e.g. comprising error concealment.

Both, communication interface 318 and communication interface 322 may be configured as unidirectional communication interfaces as indicated by the arrow for the encoded picture data 330 in FIG. 14 pointing from the source device 310 to the destination device 320, or bi-directional communication interfaces, and may be configured, e.g. to send and receive messages, e.g. to set up a connection, to acknowledge and/or re-send lost or delayed data including picture data, and exchange any other information related to the communication link and/or data transmission, e.g. encoded picture data transmission.

The decoder 200 is configured to receive the encoded picture data and provide decoded picture data or a decoded picture (further details have been described, e.g., based on FIG. 2).

The post-processor 326 of destination device 320 is configured to post-process the decoded picture data, e.g. the decoded picture, to obtain post-processed picture data 327, e.g. a post-processed picture 327. The post-processing performed by the post-processing unit 326 may comprise, e.g.

color format conversion (e.g. from YCbCr to RGB), color correction, trimming, or re-sampling, or any other processing, e.g. for preparing the decoded picture data for display, e.g. by display device 328.

The display device 328 of the destination device 320 is configured to receive the post-processed picture data 327 for displaying the picture, e.g. to a user or viewer. The display device 328 may be or comprise any kind of display for representing the reconstructed picture, e.g. an integrated or external display or monitor. The displays may, e.g. comprise cathode ray tubes (CRT), liquid crystal displays (LCD), plasma displays, organic light emitting diodes (OLED) displays or any kind of other display including beamer, hologram, or 3D/VR glasses.

Although FIG. 14 depicts the source device 310 and the destination device 320 as separate devices, embodiments of devices may also comprise both or both functionalities, the source device 310 or corresponding functionality and the destination device 320 or corresponding functionality. In such embodiments the source device 310 or corresponding functionality and the destination device 320 or corresponding functionality may be implemented using the same hardware and/or software or by separate hardware and/or software or any combination thereof.

As will be apparent for the skilled person based on the description, the existence and (exact) split of functionalities of the different units or functionalities within the source device 310 and/or destination device 320 as shown in FIG. 14 may vary depending on the actual device and application.

Therefore, the source device 310 and the destination device 320 as shown in FIG. 14 are just example embodiments of the invention and embodiments of the invention are not limited to those shown in FIG. 14.

Source device 310 and destination device 320 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices, broadcast receiver device, or the like, and may use no or any kind of operating system.

Figure 15:
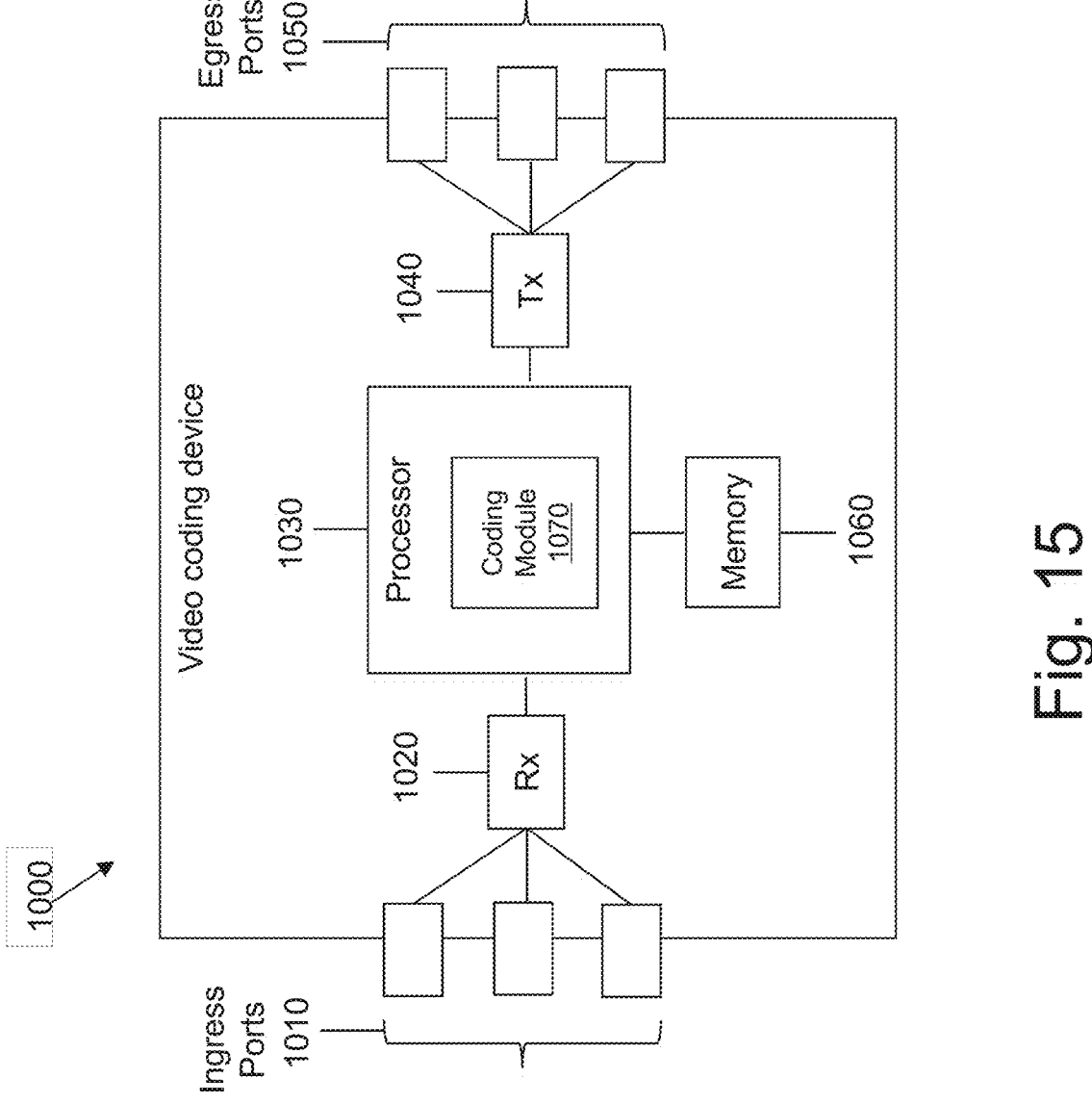
FIG. 15 is a schematic diagram of a video coding device.

FIG. 15 is a schematic diagram of a video coding device 1000 according to an embodiment of the disclosure. The video coding device 1000 is suitable for implementing the disclosed embodiments as described herein for example as an encoder or decoder. The video coding device 1000 comprises ingress ports 1010 and receiver units (Rx) 1020 for receiving data; a processor, logic unit, or central processing unit (CPU) 1030 to process the data; transmitter units (Tx) 1040 and egress ports 1050 for transmitting the data; and a memory 1060 for storing the data. The video coding device 1000 may also comprise optical-to-electrical (OE) components and electrical-to-optical (EO) components coupled to the ingress ports 1010, the receiver units 1020, the transmitter units 1040, and the egress ports 1050 for egress or ingress of optical or electrical signals.

The present disclosure may be implemented in an apparatus. Such apparatus may be a combination of a software and hardware. For example, the intra-prediction and deblocking filtering may be performed by a chip such as a general purpose processor, or a digital signal processor (DSP), or a field programmable gate array (FPGA), or the like. However, the present invention is not limited to implementation on a programmable hardware. It may be implemented on an application-specific integrated circuit (ASIC) or by a combination of the above mentioned hardware components.

The present disclosure further provides a computer readable medium storing instructions which, when executed by a processing circuitry, cause the processing circuitry to execute any of the disclosed methods for splitting, encoding, and decoding an image. The computer readable medium can be any medium on which the program is stored such as a DVD, CD, USB (flash) drive, hard disc, server storage available via a network, etc.

The encoder and/or decoder may be implemented in various devices including a TV set, set top box, PC, tablet, smartphone, or the like. It may be a software, app implementing the method steps.

Summarizing, the present disclosure provides apparatuses and methods for splitting an image into coding units. An image is divided into coding tree units (CTUs) which are hierarchically partitioned. Hierarchical partitioning includes multi-type partitioning such as binary tree or quad tree splitting. For CTUs completely within the image and CTUs on the boundary, respective multi-type partition depths are chosen. The present disclosure provides for multi-type partitioning flexibility in a boundary portion of the image.

What is claimed is:

1. A method for splitting an image into coding units, the method comprising:

subdividing the image into coding tree units (CTUs) including a non-boundary CTU with a predetermined size and a boundary CTU having a portion within the image delimited by an image boundary, the portion having a size smaller than the predetermined size in a direction perpendicular to the image boundary; and partitioning the non-boundary CTU and the boundary CTU hierarchically into respective coding units, wherein the hierarchical partitioning of the boundary CTU includes multi-type splitting with a maximum boundary multi-type partition depth (ExtdMaxBTTDepth), wherein $$ExtdMaxBTTDepth = BTTBPDepth + MaxBTTDepth,$$

and wherein BTTBPDepth denotes an adaptive boundary multi-type partition depth, and MaxBTTDepth denotes a predefined multi-type partition depth, wherein the adaptive boundary multi-type partition depth is increased by one when there is one layer of binary tree (BT) boundary partitioning (BP).

2. The method according to claim 1, wherein the adaptive boundary multi-type partition depth is not increased when a splitting direction is perpendicular to the image boundary.

3. The method according to claim 1, wherein the adaptive boundary multi-type partition depth is increased by N when there are N layers of binary and ternary tree (BTT) boundary partitioning (BP).

4. The method according to claim 3, wherein N equals to 1, 2, 3 or 4.

5. The method according to claim 1, wherein the boundary CTU is determined by comparing a sample position in a CTU with a vertical or horizontal image size in samples.

6. The method according to claim 1, further comprising:

encoding the coding units; and generating a bitstream including the encoded coding units and partitioning information indicating how the coding tree units are partitioned.

7. The method according to claim 1, further comprising:

parsing a bitstream including encoded coding units to reconstruct the image.

8. An apparatus for splitting an image into coding units, the apparatus including a processor configured to:

subdivide the image into coding tree units (CTUs) including a non-boundary CTU with a predetermined size and a boundary CTU having a portion within the image delimited by an image boundary, the portion having a size smaller than the predetermined size in a direction perpendicular to the image boundary; and partition the non-boundary CTU and the boundary CTU hierarchically into respective coding units, wherein the hierarchical partitioning of the boundary CTU includes multi-type splitting with a maximum boundary multi-type partition depth (ExtdMaxBTTDepth), wherein $$ExtdMaxBTTDepth = BTTBPDepth + MaxBTTDepth,$$

and wherein BTTBPDepth denotes an adaptive boundary multi-type partition depth, and MaxBTTDepth denotes a predefined multi-type partition depth, wherein the adaptive boundary multi-type partition depth is increased by one when there is one layer of binary tree (BT) boundary partitioning (BP).

9. The apparatus according to claim 8, wherein the adaptive boundary multi-type partition depth is not increased when a splitting direction is perpendicular to the image boundary.

10. The apparatus according to claim 8, wherein the adaptive boundary multi-type partition depth is increased by N when there are N layers of binary and ternary tree (BTT) boundary partitioning (BP).

11. The apparatus according to claim 10, wherein N equals to 1, 2, 3 or 4.

12. The apparatus according to claim 8, wherein the boundary CTU is determined by comparing a sample position in a CTU with a vertical or horizontal image size in samples.

13. The apparatus according to claim 8, wherein the processing unit is further configured to:
  encoding the coding units; and
  generating a bitstream including the encoded coding units and partitioning information indicating how the coding tree units are partitioned.

14. The apparatus according to claim 8, wherein the processor is further configured to:
  parse a bitstream including encoded coding units to reconstruct the image.

15. A non-transitory computer readable medium storing instructions which, when executed by a processor, cause the processor to:
  subdivide the image into coding tree units (CTUs) including a non-boundary CTU with a predetermined size and a boundary CTU having a portion within the image delimited by an image boundary, the portion having a size smaller than the predetermined size in a direction perpendicular to the image boundary; and
  partition the non-boundary CTU and the boundary CTU hierarchically into respective coding units,
  wherein the hierarchical partitioning of the boundary CTU includes multi-type splitting with a maximum boundary multi-type partition depth (ExtdMaxBTTDepth),
  wherein $$ExtdMaxBTTDepth = BTTBPDepth + MaxBTTDepth,$$

and
  wherein BTTBPDepth denotes an adaptive boundary multi-type partition depth, and MaxBTTDepth denotes a predefined multi-type partition depth, wherein the adaptive boundary multi-type partition depth is increased by one when there is one layer of binary tree (BT) boundary partitioning (BP).

16. The non-transitory computer readable medium according to claim 15, wherein the adaptive boundary multi-type partition depth is not increased when a splitting direction is perpendicular to the image boundary.

17. The non-transitory computer readable medium according to claim 15, wherein the adaptive boundary multi-type partition depth is increased by N when there are N layers of binary and ternary tree (BTT) boundary partitioning (BP), wherein N equals to 1, 2, 3 or 4.

18. The non-transitory computer readable medium according to claim 15, wherein the boundary CTU is determined by comparing a sample position in a CTU with a vertical or horizontal image size in samples.

19. The non-transitory computer readable medium according to claim 15, wherein encoded coding units and partitioning information indicating how the coding tree units are partitioned are included in a bitstream.

* * * * *